US009556971B2

(12) United States Patent
Pionetti et al.

(10) Patent No.: US 9,556,971 B2
(45) Date of Patent: Jan. 31, 2017

(54) MODULAR DEVICE FOR THE STORAGE AND HANDLING OF A PLURALITY OF FLEXIBLE PIPES

(75) Inventors: François-Régis Pionetti, La Baleine (FR); Xavier Rocher, Chatou (FR)

(73) Assignee: Saipem S.A., Montigny le Bretonneux (FR)

( * ) Notice: Subject to any disclaimer, the term of this patent is extended or adjusted under 35 U.S.C. 154(b) by 751 days.

(21) Appl. No.: 13/881,299

(22) PCT Filed: Sep. 26, 2011

(86) PCT No.: PCT/FR2011/052225
§ 371 (c)(1),
(2), (4) Date: May 9, 2013

(87) PCT Pub. No.: WO2012/056133
PCT Pub. Date: May 3, 2012

(65) Prior Publication Data
US 2013/0216315 A1 Aug. 22, 2013

(30) Foreign Application Priority Data

Oct. 25, 2010 (FR) ...................................... 10 58734
Nov. 19, 2010 (FR) ...................................... 10 59509

(51) Int. Cl.
*B63B 35/03* (2006.01)
*B63B 35/04* (2006.01)
(Continued)

(52) U.S. Cl.
CPC ................. *F16L 1/12* (2013.01); *B63B 35/03* (2013.01); *B63B 35/04* (2013.01); *F16L 1/16* (2013.01); *F16L 1/202* (2013.01); *F16L 1/203* (2013.01)

(58) Field of Classification Search
CPC ............ B63B 35/03; B63B 35/04; F16L 1/19; F16L 1/203; F16L 1/235; F16L 1/207; F16L 1/202; E21B 19/22
(Continued)

(56) References Cited

U.S. PATENT DOCUMENTS 3,021,092 A * 2/1962 Whearley ............... B65H 49/02
242/118.4
3,093,333 A * 6/1963 Bishop ..................... B63B 35/04
211/60.1
(Continued)

FOREIGN PATENT DOCUMENTS

| EP | 1118572 | 7/2001 |
|---|---|---|
| WO | WO/2004/068012 | 8/2004 |
| WO | WO/2009/129223 | 10/2009 |

OTHER PUBLICATIONS

International Search Report dated Nov. 25, 2011.

*Primary Examiner* — Benjamin Fiorello
*Assistant Examiner* — Edwin Toledo-Duran
(74) *Attorney, Agent, or Firm* — Cozen O'Connor

(57) ABSTRACT

A modular storage and holder device for a plurality of flexible lines having a circular turntable arranged on a plane such as the deck of a ship and having reversibly attached thereto a central cylinder around which at least a first line is wound in carousel mode with a plurality of coaxial layers of helically superposed touching turns, internal posts serving as a winding support for at least one second flexible line itself retained by a series of second intermediate posts around which it is possible to wind at least one third flexible line, itself retained by peripheral retaining posts at the periphery of the turntable, the second and third lines being wound in rotary basket type mode having superposed pluralities of layers of juxtaposed concentric touching turns resting on a common plane.

19 Claims, 7 Drawing Sheets

(51) Int. Cl.
*F16L 1/19* (2006.01)
*F16L 1/235* (2006.01)
*F16L 1/12* (2006.01)
*F16L 1/20* (2006.01)
*F16L 1/16* (2006.01)

(58) Field of Classification Search
USPC .................. 405/168.3, 158, 165, 166, 168.1
See application file for complete search history.

(56) References Cited

U.S. PATENT DOCUMENTS

| | | | | | |
|---|---|---|---|---|---|
| 3,372,461 | A | * | 3/1968 | Tesson | F16L 1/203 228/155 |
| 3,630,461 | A | * | 12/1971 | Sugasti | F16L 1/203 242/128 |
| 3,641,778 | A | * | 2/1972 | Gibson | F16L 1/18 405/168.1 |
| 3,680,342 | A | * | 8/1972 | Mott | F16L 1/203 226/172 |
| 3,712,100 | A | * | 1/1973 | Key | F16L 1/203 405/168.3 |
| 3,879,659 | A | * | 4/1975 | Lawson, Jr. | G01R 31/021 242/362 |
| RE28,410 | E | * | 5/1975 | Cox | F16L 1/18 226/25 |
| 3,965,713 | A | * | 6/1976 | Horton | B21C 47/22 242/159 |
| 3,982,402 | A | * | 9/1976 | Lang | F16L 1/203 242/393 |
| 4,072,123 | A | * | 2/1978 | Byers | H02G 1/10 114/254 |
| 4,117,692 | A | * | 10/1978 | Oberg | B63B 35/03 405/158 |
| 4,230,421 | A | * | 10/1980 | Springett | F16L 1/203 405/154.1 |
| 4,243,345 | A | * | 1/1981 | Cha | F16L 1/203 242/397.3 |
| 4,260,287 | A | * | 4/1981 | Uyeda | B63B 35/03 242/390.6 |
| 4,269,540 | A | * | 5/1981 | Uyeda | B63B 35/03 226/172 |
| 4,297,054 | A | * | 10/1981 | Yenzer | F16L 1/203 405/168.3 |
| RE30,846 | E | * | 1/1982 | Lang | F16L 1/203 405/168.3 |
| 4,340,322 | A | * | 7/1982 | Springett | F16L 1/203 405/154.1 |
| 4,345,855 | A | * | 8/1982 | Uyeda | B63B 35/03 405/166 |
| 4,410,297 | A | * | 10/1983 | Lynch | E02F 5/104 242/397.3 |
| 4,647,253 | A | * | 3/1987 | Jacobson | B63B 35/04 180/124 |
| 4,659,253 | A | * | 4/1987 | Jacobson | H02G 1/10 405/158 |
| 5,346,333 | A | * | 9/1994 | Maloberti | B63B 35/03 405/158 |
| 6,733,208 | B2 | * | 5/2004 | Stockstill | B63B 35/03 405/166 |
| 7,581,904 | B2 | * | 9/2009 | Bursaux | B63B 35/03 405/166 |
| 8,747,025 | B2 | * | 6/2014 | Anderson | H02G 1/10 405/166 |
| 9,163,751 | B2 | * | 10/2015 | Hoffmann | B63B 27/20 |
| 9,249,900 | B2 | * | 2/2016 | Ardavanis | B63B 35/03 |
| 2010/0034591 | A1 | * | 2/2010 | Wilson | B63B 35/03 405/168.3 |

* cited by examiner

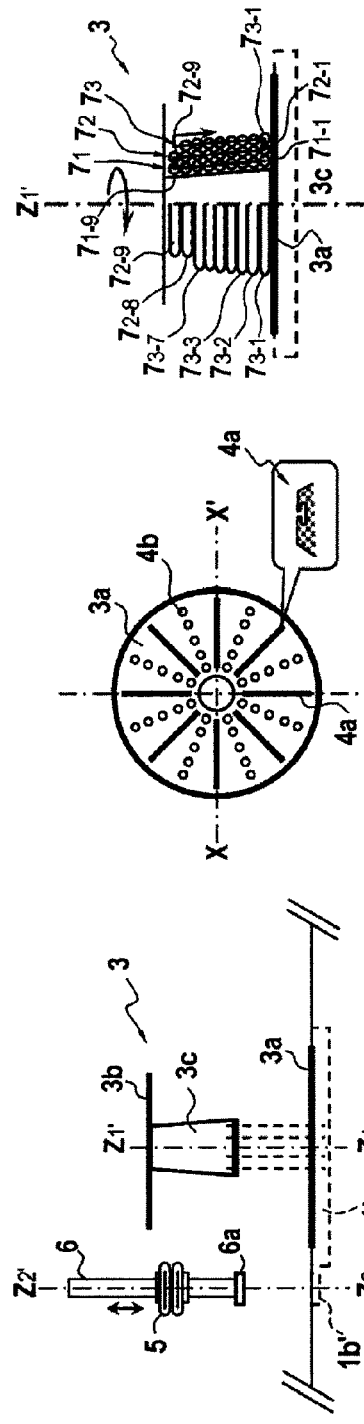
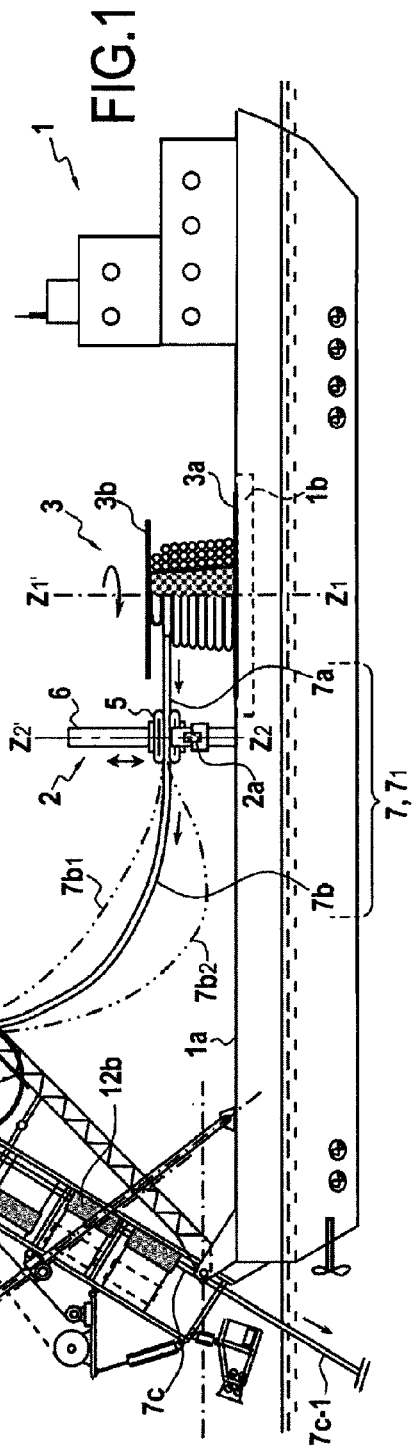

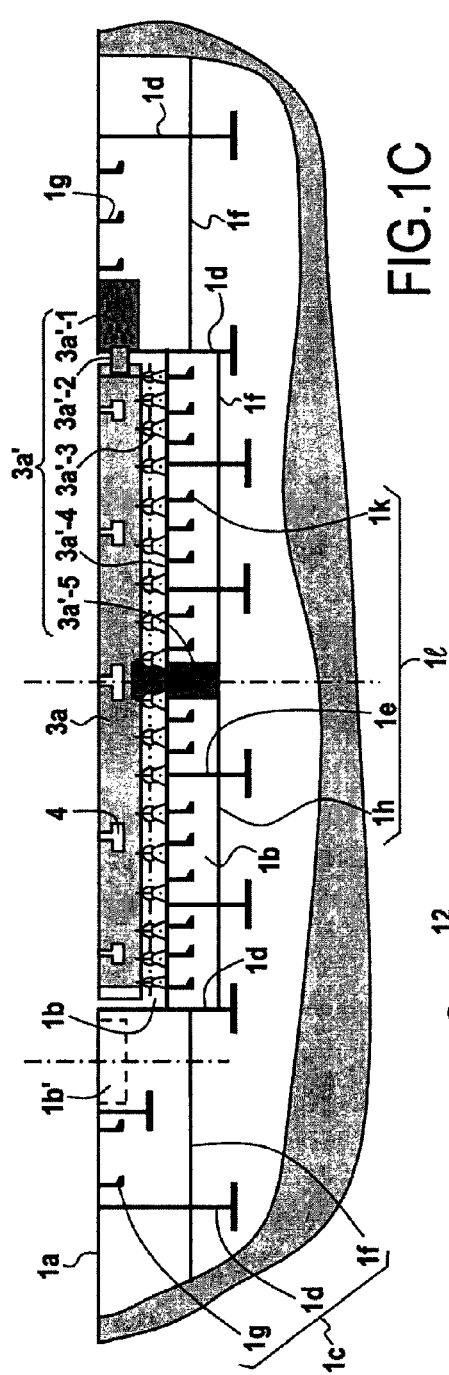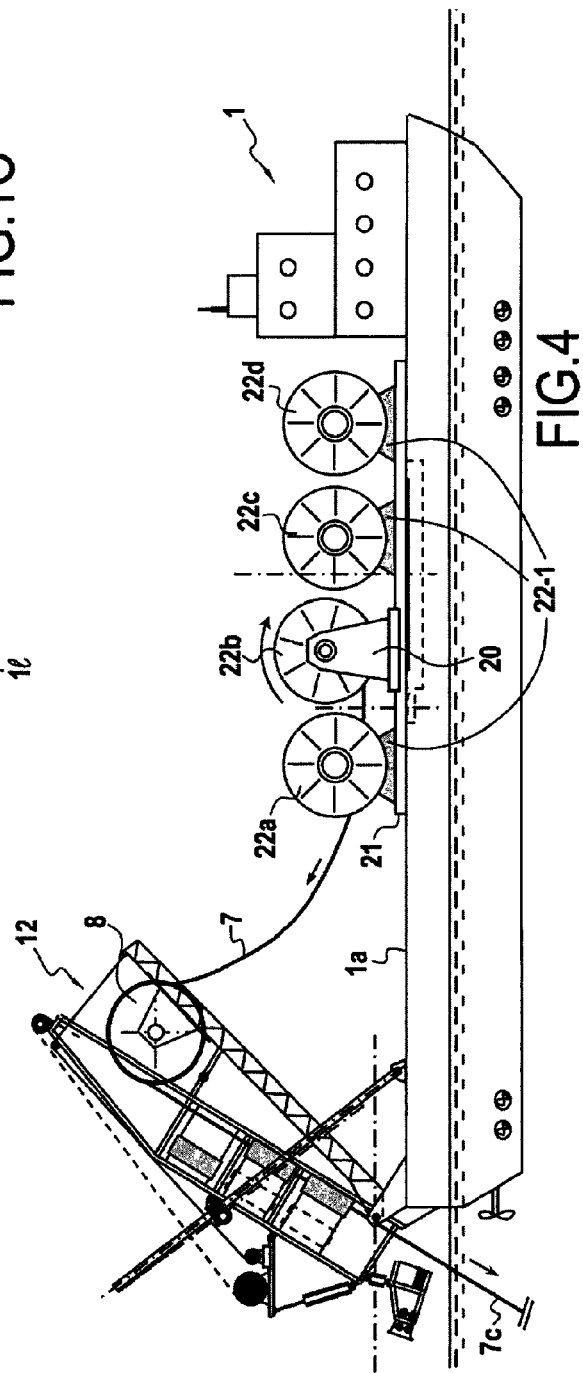

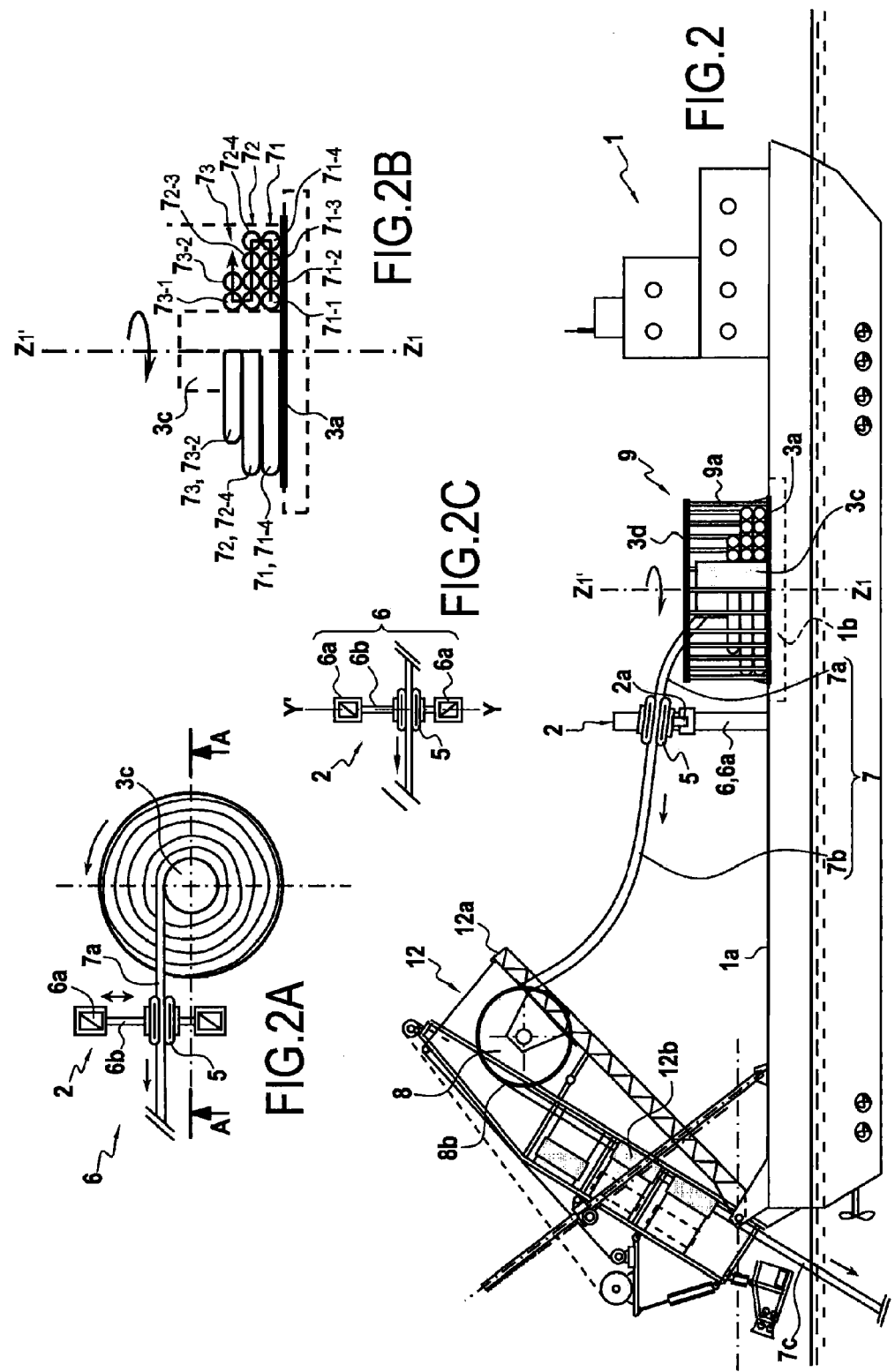

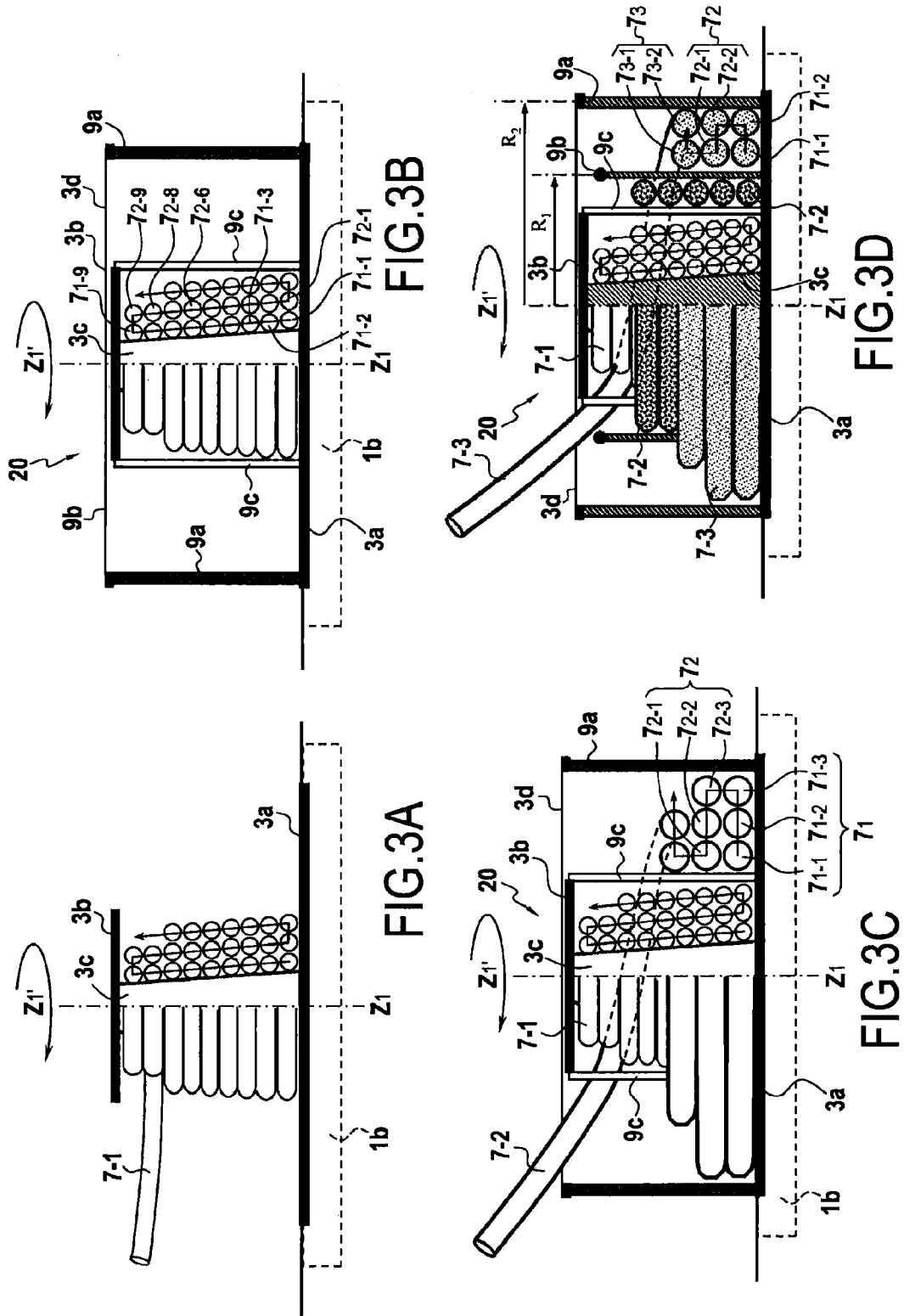

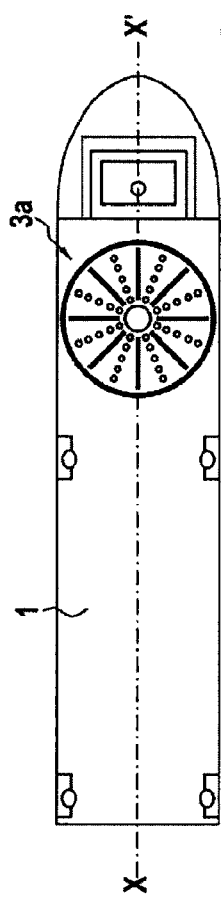
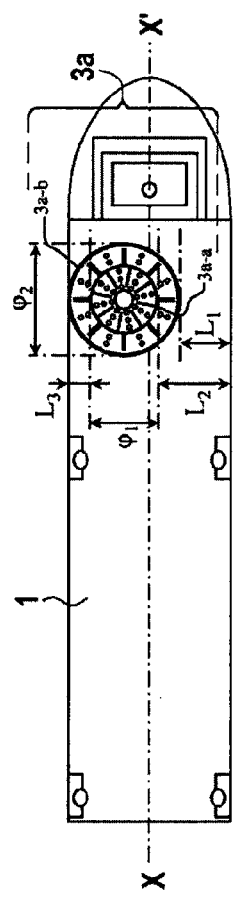
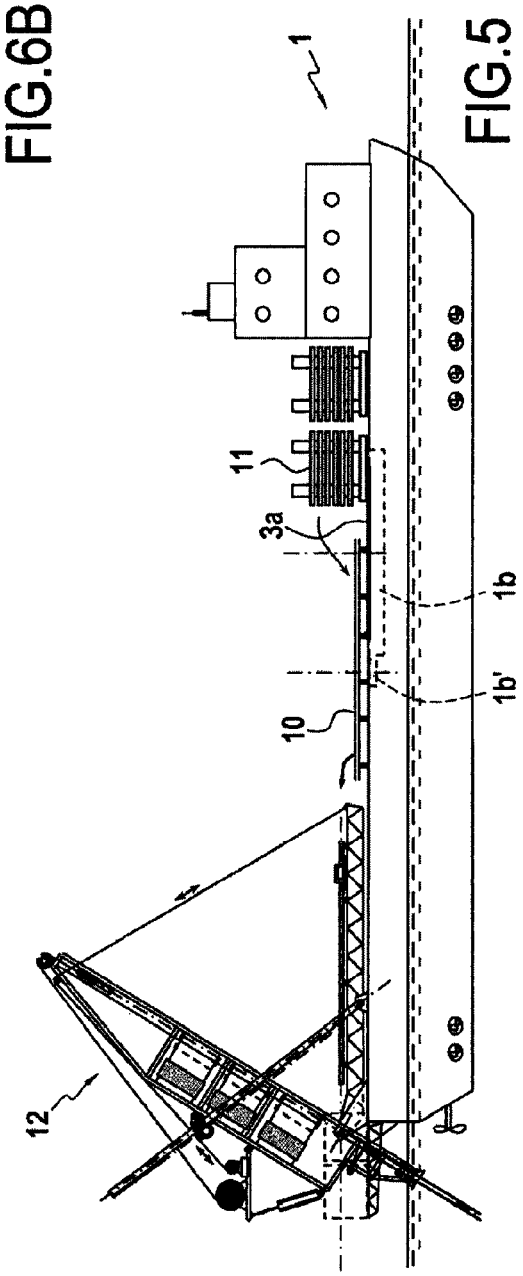

MODULAR DEVICE FOR THE STORAGE AND HANDLING OF A PLURALITY OF FLEXIBLE PIPES

RELATED APPLICATIONS

This is a U.S. national stage of application No. PCT/FR2011/052225, filed on Sep. 26, 2011. Priority is claimed on the following applications: French Application No.: 1058734 filed on Oct. 25, 2010 and French Application No.: 1059509 filed on Nov. 19, 2010, the contents of which are incorporated here by reference.

FIELD OF THE INVENTION

The present invention relates to equipment for loading, transporting, and laying flexible lines, such as flexible pipes or control umbilicals including electrical cables and arranged on board floating supports in order to be installed at sea.

BACKGROUND OF THE INVENTION

The technical sector of the invention is more particularly the field of installing lines resting on the sea bottom, and in particular including risers having flexible pipes for extracting oil, gas, or other soluble or fusible material or a suspension of mineral material from under the sea via an underwater well head and up to a floating support, in order to develop production fields installed out at sea, off shore. The main and immediate application of the invention lies in the field of producing oil at sea.

The flexible pipes used as production or service lines for conveying liquid or gaseous hydrocarbons present great mechanical strength, in particular against internal pressure, against traction, and against flattening, and they are usually laid by means of winches or traction devices such as "caterpullers" (i.e. tensioners having crawler tracks fitted with shoes that clamp against the line and that move continuously in translation in order to entrain the line therewith), or indeed by combining both winches and caterpullers.

The traction forces applied by such caterpuller devices on a flexible pipe can be considerable when laying at great depth, and the compression forces exerted by the shoes on the line must be high enough to avoid any relative slip between the shoes and the line.

A control umbilical includes one or more hydraulic lines and/or electric cables for transmitting power and/or information.

The lines referred to as "flexible pipes" are well known in the art and they are described in standards documents published by the American Petroleum Institute (API), and more particularly under the references API 17J and API RP 17B. Such flexible pipes are manufactured and sold in particular by the supplier Coflexip France.

As a general rule, such flexible pipes comprise inner sealing layers of thermoplastic material associated with layers that withstand the pressure inside the line, generally made of steel or of composite materials. Such flexible pipes are constituted more particularly by assembling layers of tubular thermoplastic materials and strong layers of steel or of composite materials made in the form of spiral-wound strips with touching turns inside the thermoplastic pipe in order to withstand internal bursting pressure, and associated with external reinforcement over the thermoplastic tubular layer and likewise in the form of touching spiral-wound strips, but at a pitch that is longer, i.e. with a smaller helical slope angle, in particular lying in the range 15° to 55°.

In the present description, the term "undersea flexible line" is used more generally to designate a cable, an umbilical, or a pipe capable of accepting a large amount of deformation without giving rise to large return forces, and in particular a flexible pipe.

In the prior art, ships for laying flexible lines at sea are fitted with devices for storing and handling said lines as described below with reference to FIG. 4. Most conventionally, a series of winches or drums of horizontal axis have line portions wound thereon and are arranged adjacent to one another in the longitudinal direction of the ship. The various line portions are thus wound on a plurality of winches, each having a horizontal cylinder between two vertical side plates. In that type of prior art embodiment, the horizontal cylinder needs to present stiffness in bending because the weight of the wound line is taken up entirely by the cylinder.

Furthermore, the weight of the line and of the winch including its vertical side plates is transmitted in full to the motor drive for the drum. This results in the winches necessarily presenting a plate size and a windable capacity in terms of line length that are limited, particularly when the diameter of the line is larger.

With flexible lines of large diameter, such conventional storage on winches as shown in FIG. 4 is often not possible since the minimum radius of curvature of such a flexible line is very large, and in particular may be as much as 5 meters (m) or more, thereby requiring drums to be of very large size and therefore unsuitable for handling.

Thus, in practice, the diameter of the end plates does not exceed 5 m to 10 m for a drum weighing 400 (metric) tonnes (t) to 500 t corresponding to portions of line presenting lengths of less than 10 kilometers (km) and in particular lengths of 1 km to 10 km for line diameters of 50 millimeters (mm) to 300 mm, which is why it is necessary, when laying lines of great length and/or of large diameter, to make use of a large number of winches that are thus arranged adjacent to one another. Finally, connecting together the various line portions in order to constitute a complete line providing a bottom-to-surface connection represents handling operations that are relatively difficult and lengthy to perform and that require the laying ship to be out of operation for long periods of time, thus representing large costs.

Devices are also known for storing and handling flexible lines that involve using "winch" type winder devices having a cylinder on which the line is wound that is vertical, with that type of device either being placed on the deck of the ship or else installed inside the ship, generally at the bottom of a hold. Nevertheless, under such circumstances, the fact that the bottom plate of the winch is arranged horizontally over the deck of the ship means that that plate receives the load in full and needs to be supported by a support and rotation device that must present a very high degree of stiffness so as to be capable, on its own, of withstanding compression forces and also bending and/or twisting forces, since the plate constitutes a turntable that needs to be kept properly plane so that the winch can be rotated about its vertical axis in a manner that is stable and accurate; it is also necessary for said winch to be removable after it has been used in order to release the deck of the ship for other operations.

Installing such equipment is difficult, since it requires the use of powerful hoist means given that the structure carrying the turntable together with said turntable presents a weight in the range 250 t to 750 t, or even more under extreme circumstances. Thus, such equipment can be installed or removed only in a sheltered zone, generally in a port, thereby preventing the ship from being used for a period of four to five days, or even several weeks.

WO 2004/068012 describes devices for storing lines by winding them, such a device comprising a circular turntable mounted over a bottom supporting surface situated above the deck of the ship on which the line storage device is installed.

In WO 2004/068012, the line storage device operates by winding in a mixed carousel and rotary basket mode described in FIG. 4B, in which an umbilical 10422 of small diameter is wound in "basket" mode (in the meaning of the definition given in paragraph (e) below concerning a storage device of the invention), the umbilical being wound against a central cylinder of the storage device, while a line 1044 of larger diameter is wound in "carousel" mode (in the meaning of the definition given in paragraph (b) below in the definition of the modular storage device of the present invention) outside posts or other retaining means of the storage device.

Thus, given the fact that the line 10422 is wound in basket mode, the central cylinder is not covered by an end plate of diameter greater than the diameter of the cylinder. On the contrary, the top opening between the central cylinder and the peripheral means 10406 for retaining the line 10422 is empty.

In contrast, a top plate 10408 is added to the tops of the winding support elements 10406 outside which and against which the line 1044 is wound in carousel mode.

In document WO 2004/068012, by necessity, the umbilical or the line wound in basket mode around the central cylinder must accommodate a smaller minimum radius of curvature and the line must therefore present a smaller diameter.

The embodiment of the mixed storage device described in WO 2004/068012 presents the drawback of requiring a central cylinder of larger diameter when the lines stored in basket mode are of large diameter, thereby making the storage zone situated between said cylinder and the axis of the basket unusable, so the overall storage capacity is thus severely reduced compared with the storage mode of the present invention. In addition, it is more difficult to perform winding in basket mode with lines or umbilicals of small diameter since winding is not performed under tension and requires more accurate control that is therefore more difficult to perform in order to form concentric turns all lying on a common plane, particularly since the diameter of the line and the diameters of the turns are small.

EP 1 118 572 confirms the analysis given above about the difficulty of winding a multi-turn layer in basket mode, the layer comprising a plurality of concentric turns resting on a common plane and being constituted by a line of small diameter, as is required in basket mode.

In WO 2004/068012, EP 1 118 572, and WO 2009/129223 which describe devices for storing lines by winding on board a ship for laying the lines at sea and including a turntable or a bottom plate, said turntable or bottom plate of the device is situated over the deck of the ship.

SUMMARY OF THE INVENTION

The object of the present invention is to provide an improved novel device for storing and holding flexible line on the deck of a ship for transporting such lines and for laying them at sea.

More particularly, the object of the invention is to provide a device for storing and handling flexible lines on board laying ships that makes it possible to perform operations of laying said flexible lines at sea that are longer, that can be laid more easily, and that can be laid more quickly; still more particularly, the object of the invention is to make it possible to release the deck of the ship more easily and more quickly once the line-laying operations have been completed and to reinstall the device as required for a new line-laying operation, as easily and as quickly as possible and to do so with relatively small handling means, thus making it possible, where necessary, for handling to be performed on site.

In order to do this, the present invention provides a modular storage and handling device for storing first to $(n+2)^{th}$ flexible lines by winding and unwinding said flexible lines, the device comprising:

a) a said circular turntable and a motor-driven device for rotating the turntable about its vertical central axis $Z_1Z_1'$, said turntable being arranged on a plane and presenting attachment elements having accessories reversibly attached thereto on its top face, said accessories comprising:
   i) a first winding support for at least a first flexible line;
   ii) first to $(n+2)^{th}$ intermediate posts forming second to $(n+2)^{th}$ winding supports respectively for second to $(n+2)^{th}$ flexible lines respectively, where $\underline{n}$ is an integer in the range 0 to 10, preferably in the range 1 to 5; and
   iii) peripheral retaining posts, said accessories extending in a direction ZZ' perpendicular to said plane and above said turntable, said attachment elements preferably being distributed regularly on the top face of said turntable, more preferably being distributed circularly and symmetrically relative to the vertical central axis of rotation $Z_1Z_1'$ of said turntable so as to enable said accessories to be attached thereto at different positions, thus enabling different diameters to be wound depending on the positions of said accessories on the surface of the turntable; and b) a said first winding support for a first line, the support having a continuous wall in the form of a tapering or right central cylinder arranged coaxially about the axis $Z_1Z_1^{1'}$ of said turntable, of diameter smaller than the diameter of the turntable, said central cylinder being surmounted by a top circular plate at its top, and preferably also being surrounded by at least one intermediate circular plate, said plate(s) presenting a diameter greater than the diameter of said central cylinder and less than the diameter of said turntable, each said first flexible line being wound in "carousel" mode in at least one layer, and preferably in a plurality of coaxial layers, more preferably k=2 to 100 layers, each layer having a plurality of touching turns superposed helically at a common radial distance from said axis ZZ', preferably having l=2 to 100 turns, more preferably 5 to 10 turns, such that the turns in the same layer are superposed by being wound helically from the bottom turn pressed against said turntable or a said intermediate plate up to a top turn coming into abutment under said top plate or a said intermediate plate, the various coaxial layers being juxtaposed and of diameters that increase from the first layer pressed against said central cylinder to the last layer radially furthest from said central axis $Z_1Z_1'$;

c) a series of a plurality of said first intermediate posts referred to as internal posts forming second winding supports for a second flexible line, said first intermediate posts being arranged circularly and preferably symmetrically relative to the central axis of rotation $Z_1Z_1'$ of said turntable and at the same constant radial distance from said axis $Z_1Z_1'$ greater than the radial distance of the last layer of said first line, and more preferably distributed regularly along their said circular positioning line on said turntable, said first intermediate posts preferably having the same height and being secured to one another at their tops by being fastened to the periphery of said top plate;

d) $\underline{n}$ series of a plurality of second to $(n+1)^{th}$ intermediate posts forming third to $(n+2)^{th}$ winding supports respectively for third to $(n+2)^{th}$ flexible lines respectively and forming second to $(n+1)^{th}$ retaining posts respectively for second to $(n+1)^{th}$ flexible line(s) respectively, said second to $(n+1)^{th}$ intermediate posts respectively being arranged circularly and preferably symmetrically relative to the central axis of rotation $Z_1Z_1'$ of said turntable at the same constant radial distance from said axis $Z_1Z_1'$ greater than the radial distance of said first to $n^{th}$ intermediate posts respectively, and more preferably distributed regularly along their said circular positioning line on said turntable, the various posts in a given series of second to $(n+1)^{th}$ intermediate posts preferably being of the same height and being successively connected to one another at their tops by respective circular rails;

e) each said second to $(n+2)^{th}$ flexible line respectively being wound in "rotary basket" type mode as at least one layer, preferably as a plurality of superposed layers of touching turns lying on a common plane, preferably m=2 to 100 layers, more preferably m=5 to 20 layers, each layer comprising at least one turn and preferably a plurality of turns, preferably p=1 to 50 turns, more preferably p=5 to 20 turns, said layers being superposed from the first layer resting on said turntable up to the last layer under the tops of the winding supports of said line, the turns of a given layer being coaxial and successively juxtaposed on a common plane, and being of diameters that increase from an "internal" turn pressed against the second to $(n+1)^{th}$ intermediate posts respectively to an "external" turn coming into abutment against the third to $(n+1)^{th}$ intermediate posts respectively for the second to $(n+1)^{th}$ flexible lines; and f) said peripheral retaining posts arranged circularly and preferably symmetrically about the central axis of rotation $Z_1Z_1'$ of said turntable at a common constant radial distance from said axis $Z_1Z_1'$ greater than the radial distance of the $(n+2)^{th}$ intermediate posts, and more preferably distributed regularly along their said circular positioning line at the periphery of said turntable, the various peripheral retaining posts preferably being of the same height and being successively connected to one another at their tops by a circular rail, it thus being possible for a $(n+2)^{th}$ flexible line to come into abutment against said peripheral retaining posts.

It can be understood that:

the turns of the various layers of the first line present the same diameter if the central cylinder is a right cylinder, and the coaxial layers of the first line go from a first layer applied against said central cylinder out to a last layer, the turns of odd-numbered layers being wound helically upwards from the bottom first turn at the bottom resting on the turntable against and beside the last turn at the bottom of the preceding layer, up to the last turn at the top coming under the top plate against and beside the first turn at the top of the preceding layer, while the turns of an even-numbered layer are wound from the first turn at the top made by winding a touching turn coaxially substantially in the same plane as the last turn at the top of the preceding layer under said top plate, followed by winding downwards to the last turn at the bottom resting on the turntable against and beside the first turn at the bottom of the preceding layer;

the turns in a given layer of the second to $(n+2)^{th}$ flexible lines present diameters that increase for even-numbered layers from the first turn referred to as the "internal" turn that is pressed against their winding supports, out to the last turn, referred to as the "external" turn that is the furthest away radially, but that do not necessarily come into abutment against the winding supports of the following line, and for odd-numbered layers, of decreasing diameters, i.e. wound in the return direction from the first turn that is referred to as the "outer" turn that is the furthest away radially made by winding helically on top of the external last turn of the preceding even layer, to an internal last turn that is superposed on the first turn of the preceding layer;

when n=0, there are only first and second flexible lines and no (0) intermediate second posts;

when there is a plurality, equal to the number q, of $i^{th}$ lines with i=1 to (n+2), this plurality of $i^{th}$ lines does not exceed q=3, and preferably does not exceed q=2 lines;

said internal posts are arranged at the same radial distance from said central axis of rotation $Z_1Z_1'$, which is preferably identical to the radius of said plates;

each said first line wound in carousel mode is arranged between two plates surrounding said cylinder at different heights or between the turntable and a first intermediate plate. The various first lines may be wound or unwound in any order;

each said first layer does not interfere with said first intermediate posts, i.e. it does not come into abutment against said first intermediate posts, since those posts are installed after the end of winding in carousel mode; and each compartment defined by two successive series of $i^{th}$ and $(i+1)^{th}$ winding supports respectively or of $(i+1)^{th}$ to $(i+2)^{th}$ intermediate posts respectively, also referred to as a "basket", is capable of containing a plurality of $i^{th}$ flexible lines wound one after and above another. Under such circumstances, said $i^{th}$ superposed flexible lines must be unwound in an order opposite to the order in which they were wound, i.e. unwinding must begin with the top line.

The configuration of the line storage device for winding in mixed carousel and rotary basket mode in the present invention is inverted relative to the device described in WO 2004/068012.

As defined in the present invention, said first line wound in carousel mode is wound against the central cylinder covered by a top plate, and the lines of relatively larger diameter, and thus of larger minimum radius of curvature can be wound in basket mode between the $i^{th}$ and $(i+1)^{th}$ intermediate posts with the space between the tops of the posts being left free, i.e. not obstructed by a top plate.

Thus, in the present invention, because the lines wound in basket mode are lines requiring a larger minimum radius of curvature, i.e. the lines of greater diameter and wound in turns of diameter greater than the diameter of the turns wound in carousel mode on the central cylinder, it is easier to perform such winding in basket mode in the present invention than it is in WO 2004/068012.

Likewise, the diameter of the central cylinder may advantageously be minimized to correspond exactly with the minimum radius of curvature of the lines stored in carousel mode, thereby correspondingly increasing the storage capacity of the device of the invention. Because the elements are modular and removable, it is advantageously possible to have a plurality of cylinders of different diameters.

The advantageous solution of the present invention requires the provision of a modular device, i.e. requires the various said intermediate posts necessarily to be attached in reversible manner since, in the present invention, said first line that is wound in carousel mode against the central cylinder cannot be unwound unless said second to $(n+2)^{th}$ flexible lines respectively have previously been unwound and said first to $(n+2)^{th}$ intermediate posts respectively have been removed from said turntable in order to allow lines to be unwound while in carousel mode.

The unwinding of lines wound in carousel mode requires said first unwound line portions to be tensioned substantially horizontally, as mentioned in paragraph ii) above. It is therefore necessary to remove the winding support elements or intermediate posts that might constitute obstacles to unwinding the first line in carousel mode while the first line portion is tensioned horizontally.

In WO 2004/068012, the various winding support elements are not or cannot be attached in reversible manner to the turntable. That is why in WO 2004/068012 the line that is wound in carousel mode is situated at the periphery, even though it would be preferable, as explained above, for winding in carousel mode to be reserved for the lines of smallest diameter, with them being wound against a said central cylinder of relatively small diameter, as is made possible by the present invention as defined above.

Still more preferably, the modular storage and handling device for flexible lines further comprises:
- a spooler device comprising at least one support element for supporting at least one flexible line guide and holder device suitable for enabling a said first portion of flexible line that extends between the guide and holder device and the last turn of the last layer of said already-wound or still-wound line to be moved vertically and/or horizontally in order to spool said flexible line around and against said winding supports, said support element preferably forming a tower or a gantry extending at least in a direction $Z_2Z_2'$ that is perpendicular to and above said deck in the proximity of said turntable;
- a said flexible line guide and holder device being suitable for enabling a first flexible line to be spooled around and against said central cylinder in "carousel" mode comprising:
  i) a traction device for the line and suitable for tensioning said first portion of the first line, said traction device preferably being a caterpuller; and
  ii) means suitable for moving said first portion of the first flexible line vertically, preferably by moving said traction device vertically so that said first portion of the first line can be tensioned substantially horizontally by said traction device in order to enable the first line to be spooled in carousel mode with a plurality of coaxial layers of superposed touching turns; and
- a said flexible line guide and holder device also being suitable for enabling second to $(n+2)^{th}$ flexible lines to be spooled around and against said first to $(n+1)^{th}$ intermediate posts respectively in "rotary basket" type mode, and comprising:
  i) a traction device for the line, preferably a caterpuller, situated at a height higher than said top plate and said intermediate posts and peripheral retaining posts; and
  ii) means suitable for moving in horizontal translation in a transverse direction YY' perpendicular to said central axis of rotation $Z_1Z_1'$, said first portion of the second to $(n+2)^{th}$ flexible line respectively extending in an inclined position, in particular a curved position, between the holder and guide device and the second to $(n+2)^{th}$ wound line respectively, preferably by moving said traction device horizontally so as to enable said line to be spooled in "rotary basket" type mode as a plurality of superposed layers of juxtaposed concentric touching turns resting on the same plane.

The term "reversible attachment" is used to mean that said accessories can be put into place and then removed in order to clear the space on top of said turntable.

The device of the invention is particularly advantageous in that it makes it possible to install a plurality of flexible lines of different kinds and in particular of different diameters with minimum constraints concerning the order in which said lines are used, as explained below.

Advantageously, said first lines wound in carousel mode are lines of smaller diameter and greater length, whereas lines of greater diameter are advantageously wound in rotary basket mode so as to constitute second to $(n+2)^{th}$ lines, which lines may be wound or unwound in any order.

Thus, mixed storage in the present invention presents the advantage of enabling a plurality of lines to be stored on a common storage device, including first lines that are very long and of smaller diameter in carousel mode, and a plurality of $i^{th}$ for i=2 to (n+2) flexible lines in rotary basket mode, which lines are either stored one on another, or else in successive individual baskets arranged radially one after another, i.e. with increasing mean diameters.

It can be understood that said deck includes in the proximity of said turntable at least one second element for attaching at least one said support element.

The term "spooling" is used herein, in known manner, to designate the action of guiding said line arranged in touching turns for the purpose of winding it and/or unwinding it:
- either by moving said line vertically, synchronously with the rotation of said turntable, said turns then being juxtaposed in superposition one above another;
- or else by moving said line horizontally, synchronously with the rotation of said turntable, said turns resting on a common plane and having continuously varying winding diameters since they are spiral wound, being juxtaposed concentrically one against another.

It can be understood that for a said first line wound in carousel mode:
- the turns of the first layer are applied against said cylinder and present a smallest winding diameter, and the turns of the second layer that are applied against the turns of the first layer present a greater winding diameter, with the following cylindrical layers being applied in succession against the preceding layers and each presenting a greater winding diameter, such that two turns of two juxtaposed layers present winding diameters that are different; and
- the first layer is formed by spooling the line upwards so as to superpose helically the turns successively one above another from said turntable on which the first turn rests at the bottom up to a top plate against which the top face of the last turn on top comes to abut, while the second layer is made by spooling downwards from the underface of the top plate until the turntable is reached. This explains why it is necessary to maintain tension in the first line portion between the holder and guide device and the already-wound or still-wound line portion on the winding support, since otherwise not only would it be impossible for the line to remain wound in stable manner, but it would also be impossible to perform winding while spooling downwards.

In this carousel mode of winding, a winding support is used that preferably has a wall that is continuous and in the form of a tapering or right central cylinder since the line needs to be spooled under tension and, if a plurality of post type winding supports distributed regularly around the circle were in use, it would run the risk of suffering excessive bending and in particular bending with a radius of curvature smaller than its minimum radius of curvature at its points of contact with said posts, thus running the risk of damaging the inner structure of said flexible lines.

It can be understood that for a second line wound in rotary basket mode:
- the first layer is made by laying the layer on the turntable and moving said line portion progressively away from said internal posts going from the "internal" first turn juxtaposed with said internal posts out to the "external" last turn coming against said second intermediate posts ("go direction"); and then
- the second layer is formed by laying the second line on the first layer while moving said line portion in the opposite direction ("return direction"), i.e. moving the line closer to said internal posts; and
- so on in the go direction and in the return direction for moving the not-yet wound first line portion for the following layers from the "external" first turn superposed on the "external" last turn of the preceding layer when it is stabilized by being retained by said second intermediate posts as far as said internal posts and so on in the opposite direction for moving the not-yet wound line portion for the following layer; said movements of said line portion away from ("go direction") and then towards ("return direction") relative to said internal posts for spooling purposes being synchronized with the rotation of the turntable.

Furthermore, in this "rotary basket" type mode of winding, the space between two successive $i^{th}$ and $(i+1)^{th}$ series of intermediate posts is not covered by a said plate that could obstruct passage of the line, thus making it possible to wind/unwind said non-tensioned first line portion properly against said support elements, insofar as said first line portion is not arranged horizontally, but is inclined from the holder and guide device towards said winding support elements situated below said central cylinder, and insofar as said first line portion must be capable of being moved in horizontal translation in said space.

In the present description, the term "circularly arranged" is used to mean that said elements are arranged along a circle, and in particular when referring to posts, that the bases and the tops of said posts are arranged along respective circles.

It can be understood that said first portion of the second or $i^{th}$ line is inclined and generally curved between said holder and guide device and the already-wound or still-wound line and passes into the empty space between the successive series of said winding supports, said space not being obstructed by a said plate.

For unwinding the second or $i^{th}$ line in rotary basket mode, the use of a plurality of intermediate posts as winding supports represents a smaller risk of imparting excessive curvature to the second line, since the flexible line is not under tension.

More particularly, the storage and handling device comprises a single line holder and guide device suitable for being moved vertically or horizontally at constant height to move relative to a second support element of said flexible line guide and holder device, said second support element comprising a gantry.

This embodiment is the preferred embodiment of the flexible line storage and handling device since it makes it possible to avoid using two distinct pieces of equipment or a single piece of equipment that requires major transformations that are difficult to perform on site, on the open sea, in order to change between carousel mode winding and rotary basket mode winding, thereby avoiding the ship being expensively held up in port.

This mixed guide device presents the advantage of making it possible without major modification to change from spooling that is appropriate for winding/unwinding in carousel mode to spooling that is appropriate for rotary basket mode, without requiring large handling means for passing from one mode to another as in the prior art.

The embodiment referred to as being of the "mixed" type is also preferred since it makes it possible to optimize use of two flexible lines of different diameters.

Flexible lines of smaller diameter are easier to wind as helical superposed turns in carousel mode since it is more difficult to arrange touching turns of concentric increasing turn diameter on a plane in rotary basket mode with small-diameter lines.

Furthermore, flexible lines of relatively small diameter have a minimum radius of curvature that is also relatively small, thus enabling them to be wound on a central cylinder of relatively small diameter, thereby achieving a corresponding increase in the maximum storage capacity in carousel mode in terms of the length of flexible line that can be stored.

Also preferably, in the storage and handling device of the invention, at least two flexible lines are wound on the mixed storage and handling device comprising:
- at least said first line, preferably a first flexible pipe, of smaller diameter wound on a said central cylinder in carousel mode; and
- at least one said flexible second to $(n+2)^{th}$ line, preferably of greater diameter wound in rotary basket mode.

Advantageously, said turntable is made up of two concentric portions comprising:
- an inner first turntable in the form of a disk suitable for being driven in rotation; and
- an outer second turntable of annular shape that is concentric with said first turntable and arranged around said first turntable, said second turntable being suitable for being held stationary or for being driven in rotation together with said first turntable when said first turntable is driven in rotation.

This embodiment is advantageous in that it serves to release an area of deck of varying size depending on the storage capacities in use of the storage device, as explained below.

Thus, the inner first turntable may be used in carousel mode, in basket mode, and in mixed mode, in which case the outer second turntable either has no posts if the first turntable is used in carousel mode only, or else it has only said retaining posts if said first and second turntables are driven together in rotation as a unit and used in basket mode or in mixed mode, or else it has said retaining posts and said intermediate winding support posts if the first and second turntables are suitable for being driven together in rotation as a unit and used in basket mode or in mixed mode The present invention also provides a laying ship for laying flexible undersea lines and fitted with a device according to any one of claims 1 to 6, said ship being characterized in that it comprises a laying ship for laying flexible undersea lines at sea, the ship having a deck including a cavity having arranged therein said turntable and a motor-driven support and rotation device for the circular turntable, the top face of said circular turntable not projecting significantly beyond the level of the portion of the deck that is immediately juxtaposed laterally thereto, the periphery of said turntable preferably coming level with said deck, said turntable being supported by and co-operating in rotation with elements (3a'-1, 3a'-2, 3a'-4, 3a'-5) of the support and rotation device within said cavity and being fastened to the carrier structure (1c, 1l) of the hull of the ship, in order to be left there permanently.

It can be understood that each portion of the top face of said turntable does not project beyond the level of the portion of the plane of the deck that is adjacent thereto, i.e. that is the closest thereto, in a direction that is perpendicular to said plane at said plane portion.

The term "carrier structure of the hull of the ship" is used herein to mean the structure that is also commonly referred to as the "hull girder", having the role of supporting the ship proper together with its load both on deck and in its holds, while the hull is subjected to buoyancy thrust. In a manner known to the person skilled in the art, the hull girder has main transverse structural elements referred to as "frames" and secondary transverse and longitudinal structural elements known as "bulb profiles" together with longitudinal structural elements in the form of "primary beams", with the top portions of said structural elements serving to support the deck of the ship.

The term "deck of the ship" is thus used herein to mean the top wall of the "hull girder", with this top wall being a thick metal sheet ("deck plate"). It is generally continuous from the stern of the ship to the bow of the ship and out to the sides from port to starboard. This top wall is substantially horizontal or possibly slopes a little from and on either side of the middle longitudinal axis of the deck towards its respective sides. The running portion of the deck is thus constituted by thick metal sheet secured to said frame and bulb profile type transverse structural elements and to said longitudinal structural elements situated under said deck plate.

It can be understood that in the present invention, the ship has a hull girder that is configured while the ship is being built so as to create said cavity that is suitable for receiving and supporting said turntable and its support and rotation device, together with the load on said turntable, in particular said device for storing and handling flexible lines and the line(s) stored on said turntable.

A first advantage of the invention relates to the principle of the turntable being incorporated in a cavity of the deck, which means there is no need to remove said turntable, since it can be left in place permanently. This presents a considerable saving of time. Since the turntable does not project significantly above the plane of the deck, and also since it includes reversible attachment means for attaching a said modular storage and handling device, it is possible to install and remove said modular device of the invention much more easily and much more quickly than it is possible to install and remove prior art devices for storing and handling flexible lines, and it is possible to do so with hoisting and handling means that are very limited, which makes it possible in certain circumstances to perform this type of operation directly on site, i.e. without any need to return to port.

Thus, by means of the device of the invention, the major part of the weight of the equipment, i.e. the weight of the turntable and its motor drive, remains permanently in place by virtue of being permanently incorporated in the cavity in the deck of the ship, so that heavy handling is required only when said ship is being built or when said turntable and its support and rotation device are being incorporated within the cavity in the deck of the ship. Likewise, the rigid support structure for the turntable that exists in the prior art is replaced by the carrier structure of the ship itself, possibly with local reinforcement, and thus remains permanently integrated in the ship in the device of the invention and therefore requires heavy handling only when building said ship or when incorporating said turntable and its support and rotation device within the cavity in the deck of the ship, it being understood that the turntable and the rigid support structure that exists in the prior art may represent an overall weight lying in the range 150 t to 750 t, or even more.

Another result of incorporating the turntable and its rotary drive device permanently within said cavity is that the stiffness required of said turntable is relatively small, since said turntable needs to transfer only forces that result from the load it is carrying without it also being necessary to take up any repeated twisting and/or bending forces, as would be required if said turntable needed to be handled in order to be removed together with its support and rotation device after each occasion it has been used, as in the prior art.

More particularly, the carrier structure of said turntable comprises a floor incorporated in the hull girder and forming an integral portion of said hull girder, consisting in a downward setback of a substantially circular portion of the deck, said floor constituting the top wall of the hull girder within said cavity and performing a role similar to that of the deck plate in terms of the strength of said hull girder.

Preferably, said floor is secured to additional reinforcing elements within the cavity forming an integral portion of the hull girder that is configured in such a manner as to enable the hull girder to transfer the load constituted by said turntable, said support and rotation device, and its load, and to provide the stiffness required for supporting said turntable and its load.

In a particular embodiment, said carrier structure of the hull includes additional reinforcing elements in said cavity, and said support and rotation device within said cavity comprises at least:
  a floor fastened to and supported by said additional reinforcing elements of said carrier structure of the hull under said floor;
  rotary guide elements preferably comprising wheels supported by said floor and a rotary shaft supported by additional reinforcing elements of said carrier structure of the hull under said floor; and
  a motor and rotary drive elements for driving the turntable and/or said rotary shaft in rotation by actuating said motor, the elements being supported by structural elements of said carrier structure of the hull at the periphery of said cavity and/or of said additional reinforcing elements of said carrier structure of the hull in said cavity, said rotary drive elements preferably comprising gearing. Said rotary drive elements may also comprise wheels or belts.

The term "additional reinforcing elements" means structural elements that are additional to the remainder of the carrier structure of the hull and that are suitable for giving the carrier structure of the hull in the cavity the ability to take up the compression loads represented by the turntable and its load as transferred locally directly to the carrier structure of the hull of the ship in the cavity, as a result of support and rotation elements of the turntable being fastened directly to the carrier structure of the hull. It is thus possible to use modular storage and handling devices of the invention that are of large capacity and it is thus possible to install lines that are of length and/or of diameter that is/are large in comparison with the lines on modular devices supported by turntables fitted on the deck of a ship in which the hull girder is not specially configured with a cavity and additional reinforcing structures within the hull girder for supporting the turntable, and this can be done without requiring a turntable support structure to be put into place on the deck in order to take up a fraction of the compression forces and in order to provide stiffness to said turntable, as is necessary in the prior art.

More particularly, said additional reinforcing elements of said carrier structure of the hull supporting said floor within said cavity comprise frames that are lower but closer to one another in the longitudinal direction of the ship, and longitudinal beams that are lower but closer to one another in the transverse direction of the ship.

More particularly, said attachment elements comprise grooves and/or preferably threaded holes arranged radially and/or circularly, and preferably regularly distributed over the entire surface of the turntable.

It is thus possible with very limited handling means to position said accessories easily so as to form winding supports that enable windings of various diameters to be made on the surface of the turntable. In known manner, said grooves are suitable for co-operating by reversible fastening with elements that co-operate with or that incorporate the structural portions at the bottoms of said accessories and suitable for sliding therein, such as cleats. Said holes are suitable for co-operating by reversible fastening with rods that are fastened or incorporated in the bases of said accessories.

In a first preferred embodiment, the top face of said turntable is plane and substantially at the same level as the plane of said deck around said turntable.

In another embodiment, the top of said turntable is conical in shape, preferably centered on the middle longitudinal axis XX' of the ship, presenting a half-angle at the apex α greater than 95 grad, preferably equal to 98 grad to 99 grad, more preferably a half-angle at the apex α of value substantially identical to the angle of inclination relative to the vertical of said two plane portions $P_1$, $P_2$ of the deck of the ship, respectively sloping at a small angle β relative to the horizontal to starboard $P_2$ and to port $P_1$ from a central ridge arranged said middle axial longitudinal direction XX' of the ship.

It can be understood that when said turntable is a double turntable constituted by a said inner first turntable and a said annular second turntable, said first turntable is conical in shape and the second turntable is frustoconical in shape having the same half-angle at the apex.

Under all circumstances, each portion of said turntable, or where appropriate each portion of said second turntable does not project, in a direction perpendicular to said plane, beyond the level of said plane of the deck closest to which it is juxtaposed, i.e. the plane of said deck that is situated on the same side of said central ridge as said turntable portion.

The present invention also provides, more particularly, a ship for laying line at sea in accordance with the invention and further comprising a J-lay tower and at least one said flexible line wound around a said storage and handling device including a holder and guide device for holding and guiding a line portion extending between said holder and guide device and the wound line, said line including a curved second line portion of catenary shape that is subjected to the tension solely of its own weight extending between said holder and guide device and a sheave arranged at a greater height on the tower, preferably at the top of the tower, and a third line portion extending in rectilinear manner within the tower being tensioned with the help of a second traction device secured to said J-lay tower and preferably of the caterpuller type.

The means suitable for moving said first line portion vertically and/or horizontally and extending between said holder and guide device and the already-wound or still-wound line on said winding supports, depend on the embodiment of the storage and handling device, and they may comprise the following variants:

1) in a "rotary basket" type embodiment of the storage and handling device: a motor and guide rails and/or slideways suitable for moving said holder and guide device horizontally along said rail and/or slideway that is horizontal and supported by a horizontal cross-beam of a support gantry of said holder and guide device;

2) in a "carousel" type embodiment: a motor and vertical guide rails and/or slideways suitable for moving said traction device vertically along said rail and/or slideways supported by a post and/or a tower carrying said traction device;

3) in a "mixed" carousel and rotary basket embodiment: a motor suitable for vertically moving a said horizontal transverse beam supported by a tower or post of a gantry, and a motor suitable for horizontally moving said holder and guide device along said horizontal transverse beam; and 4) in all of the various "carousel", "rotary basket", and/or "mixed" embodiments, it is also possible to use auxiliary means such as hinged arms, suitable for moving said first line portion vertically and/or horizontally and co-operating with a holder and guide device that is stationary and/or that is itself suitable for being moved vertically and/or horizontally.

Still more particularly, said flexible line is an undersea flexible line.

The present invention also provides a method of laying a flexible line at sea from a ship of the invention, in which method the following steps are performed:

1) moving the ship in a manner that is synchronized with the running of the line through said second traction device within the J-lay tower, preferably a said second caterpuller; and 2) unwinding said line by actuating in synchronized manner rotation of said turntable, and moving said line portion that extends between said holder and guide device and the wound line in such a manner as to maintain the curvature of said line portion extending between said holder and guide device and said sheave arranged at a greater height on the tower, with a catenary curve of curvature that is at all points greater than the minimum curvature that is acceptable for the flexible line, and preferably in such a manner that said catenary line portion does not touch the deck of the ship.

In a first implementation of the method of the invention, a said first flexible line wound in carousel mode is unwound by exerting substantially constant tension on the first line portion extending horizontally between the line holder and guide device and the line wound on a said central cylinder with the help of a traction device, preferably of the caterpuller type, and located at said line holder and guide device.

In a second implementation of the method of the invention, a said second or $(n+2)^{th}$ flexible line wound in rotary basket mode is unwound without exerting tension on the first line portion extending in an inclined position between the line holder and guide device and the wound line, by synchronizing the travel speed of the line with the help of a traction device, preferably of the caterpuller type, and located at said line holder and guide device, with the speed of rotation of said turntable.

In a preferred implementation of the method of the invention, a storage and handling device of mixed type is used and the following successive steps are performed:

1) a said second or $(n+2)^{th}$ flexible line wound in rotary basket is unwound without exerting tension on said sloping first portion of line extending between the line holder and guide device and the wound line, by synchronizing the travel speed of the line with the help of a traction device, preferably of the caterpuller type at said line holder and guide device, with the speed of rotation of said turntable;

2) when all of said second to $(n+2)^{th}$ flexible lines have been unwound and laid at sea, removing said peripheral retaining posts and said intermediate posts; and 3) unwinding and laying at sea a said first line wound in carousel mode by exerting substantially constant tension on said first horizontal line portion extending in a position that is maintained substantially horizontal between the line holder and guide device and the line wound on said central cylinder with the help of a traction device, preferably of the caterpuller type at said line holder and guide device.

Conversely, in a method of storing two flexible lines by winding them on a "mixed" type storage and handling device, the following successive steps should be performed:

1) winding said first line(s) around said central cylinder in carousel mode;

2) mounting "rotary basket" compartment accessories comprising said inner and said intermediate posts forming said winding support posts, referred to as peripheral retaining posts; and 3) winding said second to $(n+2)^{th}$ lines around said inner posts or intermediate posts forming said winding supports, in rotary basket mode.

BRIEF DESCRIPTION OF THE DRAWINGS

Other characteristics and advantages of the present invention appear better in the light of the following detailed description made in illustrative and non-limiting manner, and with reference to the drawings, in which:

FIG. 1 is a side view of a laying ship fitted with a J-lay tower and a storage and handling device for a flexible line wound in a mode referred to as "carousel" mode;

FIG. 1A is a side view of various accessories of said carousel for being secured in releasable manner, i.e. in separable manner, to a turntable of a FIG. 1 storage and handling device, the accessories being installed on the deck of the laying ship and on said turntable, which turntable is substantially in continuity with the plane of said deck;

FIG. 1B is a plan view of the turntable showing the means for attaching the various accessories;

FIG. 1C is a side view of the deck of a ship including a turntable of a storage and handling device of the invention, said turntable being substantially in the same plane as said deck;

FIG. 1D is a side view of said FIG. 1 carousel showing in detail the sequence for installing the various turns and layers of flexible line on the cylinder of said carousel, while winding at the stage of winding from the last turn but one at the top of the third layer;

FIG. 2 is a side view of a laying ship fitted with a J-lay tower and a storage and handling device for a flexible line wound in a mode referred to as "rotary basket" mode;

FIG. 2A is a plan view of the FIG. 2 rotary basket type storage device;

FIG. 2B is a side view shown partially in section on the right-hand side of a line AA of FIG. 2A, showing the sequence for placing the various turns and layers of flexible line on the turntable constituting the bottom of the rotary basket type device at the stage of winding the second concentric turn of the third layer superposed on top;

FIG. 2C is a plan view of the spooler device 2 of a FIG. 2 rotary basket type device, that is also capable of co-operating with a FIG. 1 carousel type device 3, or indeed with a mixed device as described below with reference to FIGS. 3C and 3D;

FIGS. 3A, 3B, and 3C are side views, partially in section on the right, showing details of a preferred version of the invention describing a mixed carousel and rotary basket storage and handling device in which a first flexible line 7-1 is stored in carousel mode, being wound around a central cylinder (FIGS. 3A, 3B, and 3C), and a second line 7-2 is stored in rotary basket mode against the periphery of said rotary basket, said second line being wound around first intermediate posts or inner posts 9c forming second winding supports arranged around said first wound line (FIGS. 3B and 3C). In FIG. 3A, only the first line is shown being wound in carousel mode. In FIG. 3B, there are also shown the first intermediate posts 9c serving as a second winding support for a second line in rotary basket mode while winding in rotary basket mode. Furthermore, in FIG. 3C, there is also shown the second line being wound in rotary basket mode on the accessories of the rotary basket, the peripheral posts 9a serving as peripheral retaining posts for the second line;

FIG. 3D shows a mixed carousel and rotary basket type storage and handling device having wound thereon a first line $7_1$ in carousel mode, a second line $7_2$ in rotary basket mode, and a third line $7_3$ in rotary basket mode;

FIG. 4 is a side view of a laying ship fitted with a J-lay tower and a prior art device for storing and handling a flexible line of the type having motor drive that is movable on rails and suitable for fitting successively to each of the drums installed in line one behind another on the deck of the ship;

FIG. 5 is a side view of a laying ship fitted with a J-lay tower, while in operation laying rigid pipes, by assembling prefabricated strings together within said J-lay tower, said strings being stored on the deck of the ship on the turntable of a device of the invention after its accessories have been removed;

FIG. 6A is a plan view of an installation ship fitted with a turntable centered on the middle longitudinal axis XX' of the ship, the turntable having a diameter that is slightly less than the total width of said ship;

FIG. 6B is a plan view of an installation ship fitted with a double turntable installed offset to port relative to the middle longitudinal axis XX' of the ship;

DETAILED DESCRIPTION OF THE PRESENTLY PREFERRED EMBODIMENTS

Figure 3E:
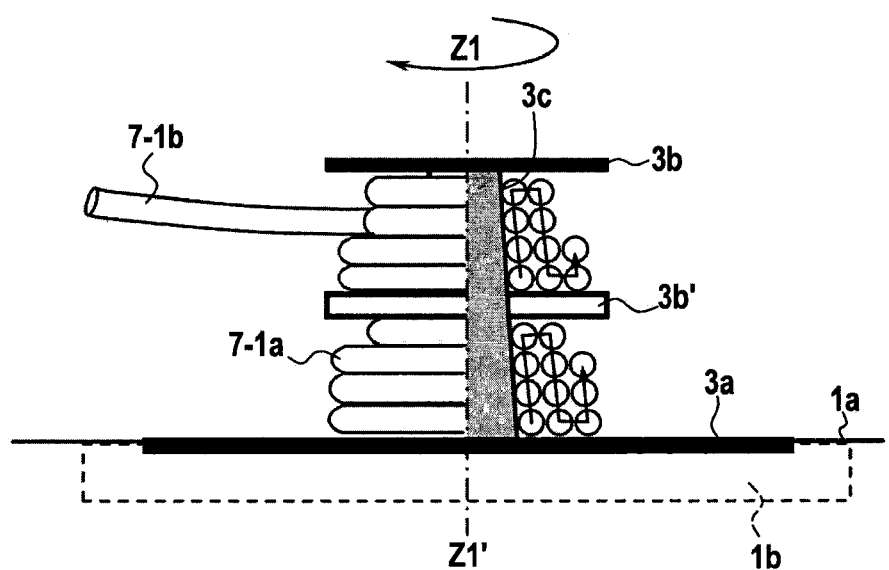
FIG. 3E shows a central cylinder of a device of the invention fitted with a top plate 3b at the top of the central cylinder and with an intermediate circular plate 3b' surrounding said central cylinder, thereby enabling two first lines 7-1a and 7-1b to be wound thereon.

FIG. 1 is a side view of a laying ship 1 fitted with a J-lay tower 12 and a device for storing and handling a flexible line in a carousel type first embodiment 3. The device is constituted by a turntable 3a driven to rotate about an axis $Z_1Z_1'$ perpendicular to said turntable by rotation means 3a' shown in FIG. 1C, and including motor drive 3a'-1 for imparting rotary drive to gearing 3a'-2 at the periphery of said turntable 3a, said turntable 3a being driven in rotation because it co-operates with a central rotary shaft 3a'-5 on the same axis $Z_1Z_1'$ and co-operating with wheels 3a'-3 situated under said turntable and over a floor 3a'-4 fastened to the load-carrying structure of the hull and of the deck of the ship, or "hull girder".

In a manner known to the person skilled in the art, the portion 1c of the hull girder outside the cavity 1b comprises under the deck, and as shown in FIG. 1C:
  main transverse structural elements or main "frames" 1d;
  secondary transverse structural elements or "bulb profiles" 1g; and
  longitudinal primary beams 1f.

Creating a cavity 1b is known to the person skilled in the art, in particular for creating a cavity that gives access from the deck to the holds of the ship.

In order to create the circular cavity 1b, the portion 1l of the hull girder is configured within the cavity 1b with lower additional reinforcing elements 1l, comprising:
  main transverse reinforcing elements forming said frames 1e and secondary transverse reinforcing elements in the form of bulb profiles 1k under the floor 3a-4b that are closer to one another in the longitudinal direction XX' than are the frames 1d and the bulb profiles 1g in the portion 1c of the hull girder;
  lower longitudinal beams 1h also supporting said floor and the rotation shaft 3a'-5, that are closer to one another in the transverse direction perpendicular to the longitudinal direction XX' than are the beams 1f in the portion 1c of the hull girder;
  the motor 3a'-1 and gearing 3a'-2 being fastened to structural elements 1c of the hull girder at the margin of the cavity and/or to reinforcing elements 1l within the cavity; and
  the wheels 3a'-3 being supported by said floor.

The wheels 3a'-3 are interposed between the turntable 3a and the floor 3a'-4, preferably on a plurality of circles of decreasing diameter about the same vertical axis $Z_1Z_1'$ for the purpose of supporting the weight of the turntable, of the equipment, and of the flexible lines, and allowing the turntable 3a to turn about the central axis of rotation 3a'-5. For clarifying the drawings, the various figures show only one series of wheels 3a'-3 distributed on a single circle of diameter substantially less than the outside diameter of said turntable. At the periphery of the cavity, the motor 3a'-1 is fastened on a transverse frame 1d or on a bulb profile 1g supporting the deck and co-operates with a toothed system in gearing 3a'-2 mounted on and/or co-operating with the periphery of said turntable 3a in order to rotate it.

The turntable is then installed in said cavity above said wheels and floor. The floor 3a'-4 performs the same role as the deck plate 1a in terms of strength. The assembly is incorporated in the cavity 1b in the deck of the ship, as shown in FIG. 1C in such a manner that the top plane of said turntable is substantially at the same level as the deck 1a of said ship.

Thus, it is essentially the hull girder, i.e. the load-carrying structure of the hull of the ship that serves to transfer all of the vertical loads from the turntable and its load, and also serves to provide the rigidity needed for supporting the turntable and for loading it.

On its top face, said turntable has attachment elements 4a, 4a-4b serving to secure a variety of accessories that are described in greater detail in the following description of the invention. Said attachment elements 4 are constituted, for example, by T-shaped grooves 4a similar to those commonly used on machine tools, and as shown in plan view and in section view in FIG. 1B, or indeed mooring elements 4b similar to those used for stowing containers on board trucks or container carrier ships, or finally, merely threaded holes drilled in the turntable for receiving stowage lugs. Thus, when no accessory is installed on said turntable, the deck of the ship is substantially plane and available for transporting loads or for performing a variety of operations, such as those shown in FIGS. 4 and 5, i.e. conventional laying of flexible lines of flexible pipe or electric cable type using winches 22a-22d with their axes of rotation parallel to the plane of the deck and perpendicular to the axis XX' (FIG. 4A), or else laying rigid lines, e.g. by assembling successive strings together (FIG. 5), or indeed transporting and handling all types of large-capacity and large-dimension structures, without any need to disassemble the component elements of said turntable 3a and of its supporting structure, as is needed in the prior art.

In the carousel mode of the storage and handling device 3, accessories are installed on the turntable 3a as shown in FIG. 1A. These accessories comprise a first winding support element constituted by a cylinder 3c that is of tapering cylindrical shape or preferably of right cylindrical shape of axis $Z_1Z_1'$ that preferably coincides with the axis of said turntable 3a, together with a top plate 3b that is preferably circular and that has the same vertical axis ZZ'. The top plate 3b is secured to the top of the cylinder 3c, with the base of the cylinder 3b being secured to the turntable 3a by the attachment elements 4. A line 7 is wound around the cylinder 3c between the top plate 3b and the turntable 3a that constitutes a bottom plate. A first caterpuller 5 with tracks or tires and known to the person skilled in the art is arranged between the carousel type device 3 and the J-lay tower 12, and it serves in known manner to exert tension on the horizontal first portion 7a of flexible line 7 that extends between the caterpuller 5 and the last turn of the last layer of the wound line. This tension is adjusted so that said tension is maintained at a substantially constant value, e.g. a tension of 5 t, so that the winding of said line on the carousel remains organized, as shown in FIG. 1D, i.e. so that the turns 7i-1 to 7i-l, with l=8, in each of the cylindrical layers 7i with i=1 to 3 being concentric, and with each being made up of superposed helical turns that remain stable and ensuring that the set of turns does not collapse, which would lead to turns overlapping and/or would run the risk of severely damaging said flexible line. While loading/winding the line on the carousel or while unloading/unwinding the line, in order to ensure that the carousel type device 3 operates correctly, use is made of a spooler device 2 suitable for moving the caterpuller 5 vertically along a support element 6 extending in a direction $Z_2Z_2'$ perpendicular to said deck so that the first portion 7a of the line that extends between the chain caterpuller 5 and the device 3 always remains substantially horizontal. Said support 6, installed to port, is constituted by a tower or post that is provided with elements for guiding the caterpuller 5 and a motor drive 2a, the base of the post 6 being secured at 1b' to the deck 1a of the ship close to the carousel 3, preferably as close as possible. Thus, while loading/winding the flexible line 7, 7-1 on said carousel 3, the turntable 3a is rotated clockwise, and in conventional manner the vertical position of the first caterpuller 5 is adjusted so that the first portion 7a of line between the caterpuller 5 and the carousel 3 remains substantially horizontal and the turns $7_1$-1 to $7_1$-9 of line wind properly one above another, while remaining in intimate contact with the preceding turns, as the first layer $7_1$ closest to the central cylinder rises, and then so that the turns $7_2$-9 to $7_2$-1 of line wind one below another in juxtaposed manner against the central cylinder 3c while building up the second layer $7_2$ until reaching the turntable, and then causing the caterpuller 5 to rise once more in order to wind the third layer $7_3$ of turns $7_3$-1 to $7_3$-9. Throughout the duration of loading, tension is kept substantially constant, e.g. at 5 t by means of the caterpuller 5, so that each of the turns is positioned against the preceding turn.

In FIG. 1D, the arrow shows the rising direction and then the falling direction and then once more the rising direction of the progression of layers $7_1$, $7_2$, and respectively $7_3$, and the turns $7i$-1 to $7i$-$n$ with i=1 to 3 and n=9 during the loading of the flexible line 7 by being wound onto the carousel 3.

More precisely, the first layer $7_1$ is made starting from the bottom first turn $7_1$-1 resting on the turntable 3a up to the top last turn $7_1$-9 beneath the top plate 3b. Then, on reaching the top of the cylinder 3c, winding begins with an additional layer $7_2$ starting from a first top turn $7_2$-9 under the top plate 3b and arranged beside and against the last top turn $7_1$-9 of the first layer $7_1$, and then continuing down to the bottom last turn $7_2$-1 of the second layer that rests on the turntable 3a against and beside the bottom first turn $7_1$-1 of the first layer $7_1$. Then, a third layer $7_3$ is built up starting with a first turn $7_3$-1 placed against the turntable $7_2$-1 resting on the turntable 3a of the second layer $7_2$ up to the top turn (not shown) of the third layer $7_3$ under the top plate 3b. As the first caterpuller 5 moves up and down, its speed of upward and downward movement is synchronized with the speed of rotation of the turntable. Throughout the entire period of unwinding or winding the flexible line 7 from or onto the carousel 3, said first caterpuller 5 is operated in a "constant tension" mode that is known to the person skilled in the art of winches. Thus, if the constant tension level is set for example at $T_0$=5 t, and if the tension tends to increase above the threshold set at $T_0$, the caterpuller unwinds a certain length of line, thereby having the effect of bringing the tension down to $T_0$; likewise, if the tension tends to drop below the threshold set at $T_0$, the caterpuller winds in a certain length of line, thus having the effect of returning the tension to $T_0$=5 t.

More particularly, the first caterpuller 5 co-operates with hydraulic actuator motors associated with a thermal unit and adjusted in such a manner that said first caterpuller 5 exerts a said traction $T_0$ on the line portion 7a. Thus, if the turntable 3a turns so as to unwind the flexible line 7, the tension in the line portion 7a decreases so the caterpuller is automatically controlled to increase the tension that it exerts on the line portion 7a by causing its tracks to turn, which tracks rub against the line in such a manner that the resulting tension exerted on the line portion 7a by the first caterpuller is once more $T_0$. Conversely, while winding, if as a result of the turntable 3a turning the tension in the line portion 7a exceeds the tension $T_0$ in the line portion 7a, the tracks of said first caterpuller 5 will turn in the opposite direction so as to move the line portion 7a in the winding direction, i.e. towards the carousel 3 so as to bring the resulting tension in the line portion 7a to the value $T_0$ and allow the flexible line to be wound on the carousel 3. Throughout transport, tension is also maintained in the line portion 7a, e.g. in the range 2 t to 5 t, so as to avoid the tapering cylindrical assembly of line wound around the cylinder 3c collapsing. If this tension were not exerted, the last turns might tend to move away from the cylinder, thereby causing the following turns to drop since they would no longer be held.

The line 7, in its line portion 7b that extends from the caterpuller 5 to the top of the J-lay tower 12 adopts a catenary curve configuration. A sheave 8 of large size is installed on the hoisting ramp 2a at the top of the tower 12, said flexible line portion 7b entering at 8a into the groove in said sheave 8 and the line portion 7c leaving at 8b, substantially on the laying axis of said tower 12. The flexible line then passes through at least one second caterpuller 12b within the tower, which maintains the line portion 7c in suspension at 7c-1 down to the sea bottom. Thus, during laying, the flexible line 7 is under moderate tension in the portion 7a, is substantially without tension other than that generated by its own weight in the line portion 7b of catenary shape, and is then subjected to the laying tension generated by the second caterpuller 12b in the portion 7c by its own weight, said laying tension possibly being as much as 100 t to 150 t, or even more for lines of large diameter in great depths of water.

The travel of the line while it is being unwound from the carousel 3 and while it passes through the tower 12 is adjusted so that the curvature of the line portion 7b remains between two limit curves 7b-1 and 7b-2 so as to maintain the curvature of said line portion 7b with curvature that is always greater than the minimum curvature that is acceptable at its junction with the sheave 8 or at its junction with the caterpuller 5, i.e. curvature having a radius of curvature that is greater than the minimum acceptable radius of curvature for the line.

FIG. 2 is a side view of a laying ship 1 fitted with a J-lay tower 12 and with a second embodiment of a storage and handling device 9 that is of a type referred to as a "rotary basket" device. Said rotary basket is shown partially in section on the right, and is constituted by said turntable 3a having a central cylinder 3c placed thereon with a vertical axis $Z_1Z_1'$ that coincides with the axis of the turntable 3a. A plurality of peripheral retaining posts 9a are arranged at the periphery of the turntable, they extend vertically and they are preferably regularly distributed circularly about an axis $Z_1Z_1'$ that coincides with the axis of the turntable, said peripheral posts 9a preferably being interconnected, e.g. at their tops, by a top rail 3d of inside diameter that is preferably equal to or greater than the diameter of the circle that is tangential to the inside face of the set of posts 9a. Thus, the top portion of the basket 9 is completely free, and it does not have a top plate at the top of the cylinder 3c. Said flexible line 7 is handled with the help of a spooler device 2 that includes a said first caterpuller 5 mounted on a support gantry 6 at a fixed height relative to the deck 1a of the ship and situated higher than the top rail 3d so that the line portion 7a going to the cylinder 3c from the first caterpuller 5 slopes with a small amount of natural and non-stressed curvature. Said gantry 6 is shown in FIGS. 2A and 2C; it comprises a horizontal cross-beam 6b extending in the transverse direction YY' and fastened on two vertical side posts 6a, such that first caterpuller 5 mounted on said cross-beam 6b can move in the horizontal direction YY' under motor drive (not shown), thereby constituting a device for performing horizontal spooling and suitable for directing the first flexible line portion 7a towards the cylinder 3c of the rotary basket in a direction that is kept permanently substantially tangential to the turn that is being formed, as shown in FIG. 2A.

In this second embodiment of the "rotary basket" type, as shown in FIGS. 2A and 2B, three superposed layers $7_1$, $7_2$, and $7_3$ are thus formed, each comprising p=4 juxtaposed concentric turns 7i-1 to 7i-p with i=1 to 3, the turns being one against another. More precisely, the first layer starts from a first turn $7_1$-1 resting on the turntable 3a and arranged against the periphery of the central cylinder 3c, and then by turning the turntable and moving the caterpuller 5 along the cross-beam 6b, a second turn $7_1$-2 is formed concentrically against the first turn $7_1$-1, and so on, until a fourth concentric turn $7_1$-4 reaches the periphery of the turntable 3a on which it rests against the inside faces of a series of peripheral posts 9a attached to the turntable 3a and serving to retain the various superposed layers $7_1$, $7_2$, and $7_3$. When the first layer has been completed, the line comes into abutment against the peripheral posts and can escape only by moving upwards, thereby naturally beginning the following layer. Thus, in order to make the second layer $7_2$, the layer starts with a peripheral turn $7_2$-4 arranged against the inside faces of the posts 9a above the last turn $7_1$-4 of the first layer, and then by moving the caterpuller 5 in the opposite direction horizontally along the cross-beam 6b while continuing to turn the turntable 3a, a concentric turn $7_2$-3 is formed of slightly smaller diameter and is placed against the inside face of the flexible line constituting the turn $7_2$-4, and so on so as to make the turn $7_2$-2 and then $7_2$-1 of decreasing diameters.

It can be understood that the retaining posts 9a define the outermost position of the turns 7i-4 and, during loading, they make it possible to begin the next layer up. These retaining posts 9a also give the assembly a stable shape and in particular they ensure that the top layer is stable.

In this second embodiment of the storage and handling device 9 in rotary basket mode, the first caterpuller 5 serves only to hold the flexible line 7 so that the first and second line portions 7a and 7b adopt a certain amount of curvature without exerting significant tension in the first line portion 7a between said first caterpuller 5 and the rotary basket device 9, in contrast to what happens with the carousel type first embodiment of the device 3.

In FIG. 2B, the direction in which loading is performed by winding layer after layer is shown in side view, showing how the turns progress and how the layers progress in this rotary basket type second embodiment of the storage and handling device 9, with each layer in this example having four turns. When the line 7 is taken to the rotary basket 9 for winding the line, or when the flexible line 7 is extracted from the rotary basket 9 for unwinding and laying at sea, the rotation of the turntable and the movement in translation of the spooler device in the horizontal direction are synchronized as is the speed of rotation of the tracks of the first caterpuller 5 in such a manner that the curvatures of the curves 7a and 7b remain acceptable, and in particular continue to have a radius of curvature that is greater than the minimum radius of curvature that is acceptable for the line.

As shown in FIG. 2A, during installation on site, the first caterpuller 5 is actuated to unwind and extract the flexible line 7 from the rotary basket type device 9 and direct it towards the sheave 8 on the tower 12, and then towards the second caterpuller 12b. Thus, only the portion 7c extending beneath the second caterpuller 12b is subjected to a large amount of laying tension, and the other two line portions 7a and 7b are subjected only to low levels of handling tension, i.e. to tensions of a few tonnes, or even less.

FIG. 3C is a side view of a first variant of a mixed carousel and rotary basket embodiment of the storage and handling device 20 of the invention. In this variant embodiment, a tapering cylinder 3c and a top plate 3b of outside diameter smaller than the diameter of the turntable 3a are installed initially, with said diameter of the top plate 3b being greater than the diameter of the last layer $7_3$ of the first line 7-1 in carousel mode as described above with reference to FIGS. 1 and 1A to 1D for storing in carousel mode. Thereafter, a first line 7-1 is stored by being wound on the device in carousel mode around a central cylinder 3c arranged coaxially with said turntable 3a, as shown in FIG. 3A. After the first flexible line 7-1 has been loaded/wound, the accessories are installed for transforming the device into rotary basket mode as follows. Installation comprises, in succession, installing a first series of posts in an intermediate position, referred to as "inner posts" 9c that are preferably distributed uniformly and circularly and that are preferably secured via their bases to attachment elements on the turntable 3a and via their tops to the top of the cylinder 3c via the outside of the top plate 3b. Said intermediate first set of posts can then act as the second winding support equivalent to the cylinder of the rotary basket type device 9 of FIG. 2 while winding a second line 7-2. Thereafter, a series of peripheral retaining posts 9a is installed that are arranged in the manner described above at the periphery of the turntable 3a, being secured via their bases to attachment elements 4 of the turntable 3a and preferably being connected to one another at their tops by a circular rail 3d. The second flexible line is then loaded/wound in rotary basket mode, as described above with reference to FIGS. 2 and 2A and 2C.

Said peripheral posts 9a are preferably distributed regularly along the circular periphery of the turntable 3a, and the inner posts 9c are located close to the peripheral last layer $7_3$ of the first line 7-1 wound on the cylinder 3c.

Thereafter, a second flexible line 7-2 is stored by being wound in rotary basket mode. To do this, the first turn $7_1$-1 of the first layer $7_1$ of the second line 7-2 is wound against the outside face of the inner posts 9c of the winding support for the second line 7-2, and then as described for the rotary basket mode, the second and third concentric turns $7_1$-2 and $7_1$-3 are wound that are juxtaposed side by side until reaching the inside faces of the peripheral posts 9a, after which the second layer $7_2$ is wound, being made up of turns $7_2$-3, $7_2$-2, and then $7_2$-1 going respectively from the peripheral retaining posts 9a towards the winding supports or inner posts 9c, followed by the third layer $7_3$ as described above going from the inner posts 9c towards the retaining posts 9a. To unwind the lines and lay them, it is appropriate to begin with unwinding and laying the second line 7-2 in rotary basket mode, after which the specific accessories should be removed from the rotary basket, i.e. the inner posts 9c and the peripheral retaining posts 9a, in order to unwind and lay the first line 7-1 in carousel mode.

This disassembly is necessary, since otherwise the first line portion 7a leaving the device in carousel mode would not be able to extend horizontally while it is being spooled, since said intermediate posts 9c and retaining posts 9a would prevent it.

In FIG. 3D, there can be seen a second variant embodiment of a mixed carousel and rotary basket device 20 of the invention. A first flexible line 7-1 is stored initially in carousel mode on a central cylinder 3c as described above. Thereafter, two respective series of first and second intermediate posts 9c and 9b are installed. The series of first intermediate posts 9c is distributed on a circle of radius R1, the series of second intermediate posts 9b being distributed on a second circle of radius R2 greater than R1. It is thus possible in rotary basket mode to load a second flexible line 7-2 against said first intermediate posts or inner posts 9c out as far as said second intermediate posts 9b acting as retaining posts for said second line 7-2. In FIG. 3D, the second line 7-2 is wound against the inner posts 9c in five superposed layers, each comprising one helically arranged turn. The second intermediate posts 9b serve as a third winding support for a third line 7-3, which is shown in FIG. 3D as having three layers $7_1$ to $7_3$, each of two juxtaposed concentric turns $7_i\text{-}p$ with i=1 to 3 and p=1 or 2. The third line 7-3 is loaded by winding in rotary basket mode, but only after installing the peripheral retaining posts 9a that serve to return the third flexible line 7-3.

While laying said line at sea, it is necessary to begin by unwinding and laying either of the second or third lines 7-2 or 7-3 in either order. It should be observed that if the second and third lines 7-2 and 7-3 were stored one after the other, i.e. one above the other in the same compartment between said inner posts 9c and said peripheral retaining posts 9a, then it would be necessary to unload and lay the line that was wound last, i.e. the top line. It would then not be possible to decide which line to lay, as is made possible by a mixed device having a plurality of series of intermediate posts as in the invention. In FIG. 3D, two series of intermediate posts 9c and 9b are used. Nevertheless, it is possible advantageously to use as many series of intermediate posts as needed as a function of the number of lines to be stored so as to retain the greatest possible flexibility for laying lines on site. In any event, it is appropriate to unwind and lay all of the lines that are stored in rotary basket mode before beginning to unwind and lay the first line that is wound in carousel mode, after removing the inner posts 9c and the various intermediate and peripheral retaining posts 9b and 9a.

In FIG. 3E, there can be seen a variant embodiment in which the central cylinder is fitted with a top circular plate 3b at its top and is surrounded by an intermediate circular plate 3b' having the same diameter and located halfway up, thus making it possible to wind a first line 7-1a from the turntable 3a up to immediately under the bottom face of the intermediate plate 3b', and then to wind a second first line 7-1b from the intermediate plate 3b' up to and immediately under the face of the top plate 3b. Under such circumstances, the two first lines 7-1a and 7-1b can be wound/unwound in either order.

FIG. 4 is a side view of conventional laying of flexible lines 7 in great depth from a series of horizontal-axis winches or drums 22a-22b-22c-22d having flexible line portions wound thereon. A drum drive unit 20 is suitable for sliding on rails 21 and for being fitted in succession to each of the drums 22a-22b-22c-22d in order to lift each one of them individually and in order to put them into rotation in succession so as to unwind the various flexible line portions 7 that have been wound onto the drums. Thus, when the first drum 22a having a line wound thereon has been unwound, the end of said line 7 is made secure. Then the empty drum 22a is put back on its support 22-1 and the drum motor drive 20 is moved to the following drum 22b and the end of the line wound on the second drum 22b is connected to the secured end of the flexible line that has already been laid. Thereafter, laying of flexible line continues by unwinding the various flexible line portions on the various following drums 22c-22d. This type of drum 22a-22b generally presents a diameter lying in the range 8 m to 12 m and a width lying in the range 5 m to 8 m, however it is capable of storing only a limited length of line portion, and the loaded drum may then weigh as much as 350 t to 750 t, or even more.

By comparison, storage in carousel mode as shown in FIG. 1 and FIGS. 3A-3D is advantageous when laying lines of very great length, since it makes it possible to store lines of greater length and/or of greater diameter, while avoiding the problems of connecting lines together as are encountered when line is stored as a plurality of segments on a plurality of drums. With flexible lines of large diameter, conventional storage on winches as shown in FIG. 4 is often not possible since the minimum radius of curvature of said flexible line is very large, typically up to 5 m or more, which would require drums 22a-22d of very large size that would then be unsuitable for handling. Storage in rotary basket mode as shown in FIGS. 2 and 3C-3D is much better adapted to lines of large diameter with a large minimum radius of curvature, since it enables long unit lengths thereof to be stored without running the risk of a radius of curvature that is less than the minimum radius of curvature. Mixed storage as described with reference to FIGS. 3A to 3C is preferred since that makes it possible to use carousel mode against the central cylinder 3c to store a long length of first line 7-1 of small or medium diameter, and to store peripherally around said inner posts 9c and second intermediate posts 9b a second line 7-2 or indeed a third line 7-3 of long length and large diameter in rotary basket mode. The diameter of the circle along which the inner posts 9c are placed to constitute the support element for winding the second line in rotary basket mode in the mixed device must be greater than the minimum diameter of curvature of said second flexible line 7-2, even though the central cylinder 3c presents a diameter that is too small and thus incompatible with storing such a large diameter line 7-2. This winding technique of the rotary basket type is thus advantageous for flexible lines that are long and of large diameter and that cannot be wound on a cylinder of small diameter, given a minimum radius of curvature that is too great.

It is possible to wind lines of small or medium diameter, less than 200 mm over lengths of 1 km to 200 km on a cylinder 3c having a diameter of 1 m to 15 m and a height of 3 m to 10 m, using a carousel type device of small or medium diameter. It is also possible with a rotary basket type device to wind lines of larger diameters, in particular diameters greater than 200 mm and for lengths that also exceed 1 km, with the circle of inner posts 9c presenting a diameter greater 8 m, and in particular lying in the range 12 m to 30 m.

By way of example, a turntable 3a having a diameter of 30 m and capable of supporting a load of 5000 t can be used to store a line over a height of 6 m as follows:
  in carousel mode: 150 km of electric cable having a diameter of 150 mm and a weight per unit length of 25 kilograms per meter (kg/m), i.e. about 76 layers of 40 turns representing a total weight of about 4000 t;
  in rotary basket mode: 12.5 m of flexible line having a diameter of 500 mm, a weight per unit length of 350 kg/m and a minimum radius of curvature R=5 m, giving about 12 layers of 18 turns, representing a total weight of about 4500 t;
  in mixed mode as shown in FIG. 3C:
    in carousel mode: 10 km of umbilical 7-1 having a diameter of 200 mm and a weight per unit length of 45 kg/m, i.e. about 15 layers of 30 turns, representing a total weight of about 450 t; plus in rotary basket mode: 18.5 km of flexible line 7-2 having a diameter of 400 mm, a weight per unit length of 200 kg/m and a minimum radius of curvature R=6 m, i.e. about 15 layers of 20 turns, representing a total weight of about 3700 t, together giving a total weight of about 4150 t; and in the mixed mode of FIG. 3D:

in carousel mode: 22.5 km of umbilical 7-1 with a diameter of 100 mm and a weight per unit length of 15 kg/m, i.e. about 20 layers of 60 turns, representing a total weight of about 350 t; plus in rotary basket mode in a first circular corridor having a cylinder diameter D1=10 m and a width of 1 m: 850 m of flexible line having a diameter of 400 m, a weight per unit length of 180 kg/m, and a minimum radius of curvature R=4 m, i.e. about 13 layers of two turns, representing a total weight of about 160 t; plus in rotary basket mode in a second circular corridor having a cylinder diameter D2=14 m and a width of 3 m: 3900 m of flexible line having a diameter of 450 mm, a weight per unit length of 300 kg/m, and a minimum radius of curvature R=4 m, i.e. about 13 layers of six turns, representing a total weight of about 1200 t; plus in rotary basket mode in a third circular corridor having a cylinder diameter D3=22 m and a width of 2.5 m: 3900 m of flexible line having a diameter of 600 mm, with a linear weight of 450 kg/m and a minimum radius of curvature R=6 m, i.e. about ten layers of five turns representing a total weight of about 1800 t, the entire weight then coming to about 3510 t.

FIG. 6A shows a turntable 3a with a diameter of 30 m and a capacity of 8000 t installed on the axis of the deck of an installation ship, near the bow.

FIG. 6B shows a double turntable 3a with a diameter of 20 m and a capacity of 4500 t installed on the deck of an installation ship near the bow, said double turntable 3a being offset to port so as to leave a free passage on the starboard side when said turntable is fitted in carousel mode, in rotary basket mode, or in mixed mode. The double turntable is constituted by an inner first turntable 3a-a of diameter $\phi_1$ that is in the shape of a disk, and an outer second turntable 3a-b that is annular in shape and arranged concentrically around said first turntable, independently of said first turntable, with an outside diameter $\phi_2$ such that $\phi_2 > \phi_1$. The two turntables lie in the same plane and substantially in the same plane as the deck of the ship. Motor drive acts on the inner turntable 3a-a and the second turntable 3a-b can either be held stationary while the first turntable is being driven in rotation, or else it can be secured thereto and driven in rotation together with said first turntable, or else it may be suitable for being driven in rotation independently of said first turntable, depending on the desired storage capacity. Thus, for storage of maximum capacity, the first and second turntables are secured to each other and a maximum storage capacity having a diameter $\phi_2$ is available. If it is desired to use a smaller capacity, said second turntable is left stationary, being secured directly to the deck of the ship, and the first turntable is driven in rotation so as to make available only a smaller capacity corresponding to the diameter $\phi_1$ of the first turntable 3a-3. The advantage of this arrangement lies in the free passage on the deck of the ship beside the device which then corresponds to a wide corridor of width $L_2$ when it is desired to use only said first turntable 3a-a, whereas the corridor is only of smaller width $L_1$ when the device is used to its maximum capacity, corresponding to the first and second turntables taken together. The wider corridor then enables additional equipment to be installed, and that constitutes a major advantage in numerous installation operations on oil fields at sea, because of the flexibility of the device.

For conventional line laying operations using 50 m long strings of rigid line 10 made up of unit lengths of line 11 stored on the deck of the ship and with a J-lay type tower 12, it is possible to remove said accessories 3c-3b, 9a-9b-9c, and to leave the turntable 3a in position, as shown in FIG. 5, since it is level with the deck and therefore does not interfere with the equipment that is put into place thereon.

The fact that the turntable 3a is integrated in a cavity 1b makes it possible to avoid a potential large loss of time should it be necessary to remove the turntable 3a in order to release space on the deck 1a.

Because the turntable is incorporated in the hull so as to be continuous with the plane of the deck, there is no need for it to be removed when it is desired to use the deck for other installations, thereby avoiding any need to take the boat out of operation for several days in port in order to perform this operation, and thus constituting a large economic advantage.

Figure 7A:
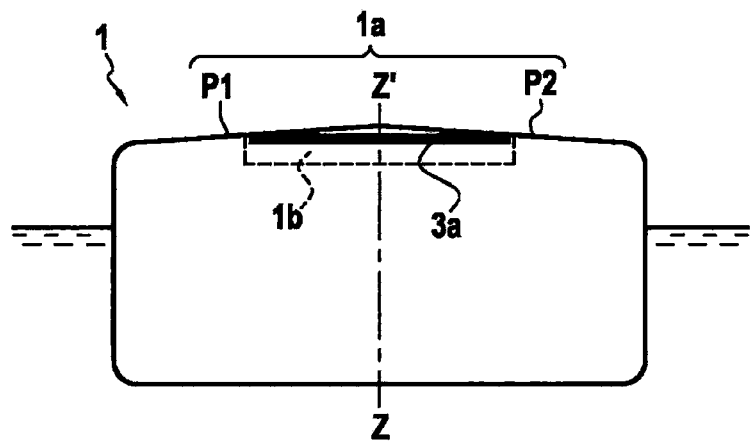
FIG. 7A shows a plane turntable seen in vertical section, the turntable being centered on the longitudinal axis XX' of the ship as shown in FIG. 6A, the deck of the ship being constituted by two planes $P_1$ and $P_2$ sloping at respective angles β to port $P_1$ and to starboard $P_2$ on either side of a central ridge running along the longitudinal direction XX' of the ship.

The deck 1a of a ship generally presents two planes $P_1$ and $P_2$ that are at a gentle slope $\beta$ relative to the horizontal, of less than 5%, and in particular in the range 1% to 2%, to port $P_1$ and to starboard $P_2$ running from a central axial ridge XX' so that rain water or spray is directed to the sides of the ship for running off into the sea: such a deck therefore does not constitute a plane as such. Thus, said turntable is preferably plane and installed in such a manner that it does not project at any point beyond said deck of the ship, as shown in FIG. 7A. Thus, when it is not in use, there will exist a small offset in certain regions of the deck between said deck and said turntable, which offset can be compensated by wedges, e.g. wooden wedges, said wedges restoring surface continuity to the deck so as to enable the required equipment to be installed thereon. This local wedging is of thickness that varies depending on position and that lies in the range 20 mm to 200 mm-300 mm depending on the diameter of the turntable and the structure of the deck of the ship.

Figure 7B:
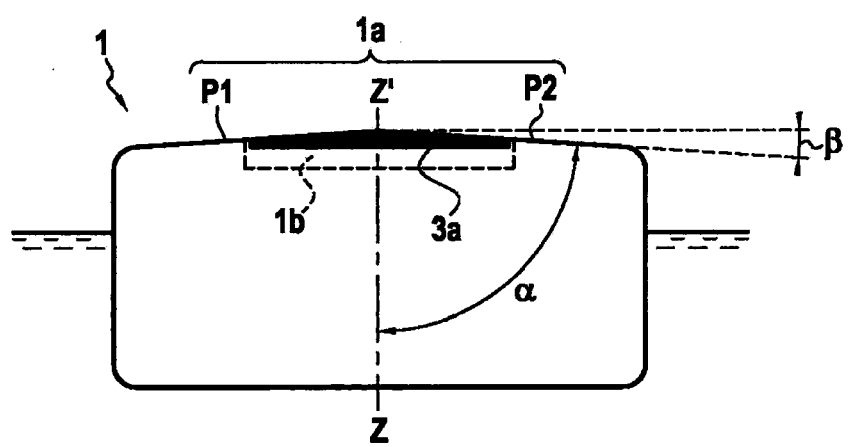
FIG. 7B is a vertical section view of a turntable having a top face S that is conical in shape and centered on the longitudinal axis XX' of the ship, with a half-angle at the apex α corresponding to the slope angle relative to the vertical of the two sloping planes respectively $P_1$ to port and $P_2$ to starboard, constituting the deck 1a of the ship.

Nevertheless, it is advantageous to make a turntable that is not plane but that is slightly conical as shown in FIG. 7B with a half-angle $\alpha$ at the apex that coincides with the angle of inclination of the planes $P_1$ and $P_2$ of the deck of the ship to port and to starboard relative to a vertical axis perpendicular to said axial central ridge XX', i.e. an angle $\beta$ of more than 95 grad or an angle $\beta$ of less than 5 grad, more particularly an angle $\beta$ in the range 1 grad to 2 grad, i.e. a half-angle at the apex $\alpha$ of the cone of 98 grad to 99 grad. Such a conical turntable should then preferably be installed on the axis of the ship as shown in FIG. 6A and in FIG. 7B. In FIG. 7B, the conical turntable is arranged in such a manner that the portions of said turntable that are situated on either side of said central ridge XX' do not project beyond the plane $P_1$ or $P_2$ of the deck situated on the same side of the central ridge XX' in a direction that is perpendicular to said plane of the deck, and the apex of said turntable does not project vertically above the central ridge XX' of said deck. In other words, said planes $P_1$ and $P_2$ on the port and starboard sides respectively of said deck are tangential to each of the portions of said turntable arranged on the same side, respectively as said port plane $P_1$ or said starboard plane $P_2$.

A turntable of the invention is typically made of steel presenting a diameter lying in the range 5 m to 50 m and a thickness lying in the range 100 mm to 800 mm.

A central cylinder 3c may be made of machine-welded sheet metal presenting a height lying in the range 3 m to 10 m with a diameter of 1 m to 10 m in carousel mode and 5 m to 15 m in rotary basket mode.

The post or gantry 6 carrying the caterpuller and the spooler system should be positioned as close as possible to the outside of the top plate 3b of the carousel and in practice within less than 5 m, and more preferably within less than 1 m.

The turntable 3a should be positioned on the deck at a distance from the J-lay tower 12 that is sufficient to ensure that the radius of curvature of the line is greater than at least three times the minimum radius of curvature that the line can accept in the portion 7b extending from said caterpuller to the top of the tower. Thus, the turntable 3a should be arranged closer to the end of the ship that is remote from the tower than to the tower.

In an embodiment, the laying ship is not fitted with a laying tower, but with a chute, generally situated at the stern of the ship. This applies in particular for laying lines in shallow waters, in particular at depths of less than 500 m.

In an embodiment, in order to perform spooling so that the flexible line is always tangential on reaching the turn that is currently being wound or unwound, it is preferable to avoid moving the caterpuller and rather to make it co-operate with guide means such as a chute and a hinged arm suitable for moving laterally and thus in the transverse direction YY' (rotary basket mode=horizontal spooling) of the ship or in the vertical direction ZZ' (carousel mode=vertical spooling).

Constant tension devices, whether using tracks or tires, and spooling systems for winches and rotary baskets are known to the person skilled in the art, and in particular they are sold by the supplier Huisman (Netherlands).

The invention claimed is:

1. A ship comprising a modular storage and handling device for storing at least first and second flexible lines, by winding and unwinding said flexible lines, the device comprising:
  a) a circular turntable mounted to the ship and a motor-driven device for rotating the turntable about a vertical central axis $Z_1Z_1'$ of said turntable, said turntable being arranged on a horizontal plane and presenting attachment elements on a top face of said turntable, said attachment elements having winding supports reversibly attached thereto, said attachment elements being arranged circularly and at different radial distances relative to the vertical central axis $Z_1Z_1'$ for rotating said turntable;
  b) said winding supports extending in a direction ZZ' perpendicular to said plane and above said turntable, and comprising:
    b.1) a first winding support for at least the first flexible line, said first winding support having a continuous wall in the form of a tapering or right central cylinder arranged coaxially about the axis $Z_1Z_1'$ of said turntable, said central cylinder being of diameter smaller than the diameter of the turntable, said central cylinder being surmounted by at least one top circular plate, said top circular plate(s) presenting a diameter greater than the diameter of said central cylinder and less than the diameter of said turntable;
    b.2) a series of a plurality of first intermediate posts forming second winding supports for at least the second flexible line, said first intermediate posts being arranged circularly relative to the central axis of rotation $Z_1Z_1'$ of said turntable and at the same constant radial distance from said axis $Z_1Z_1'$ greater than the radial distance of said first winding support, said first intermediate posts being secured to one another at the tops of said first intermediate posts by being fastened to the periphery of said top circular plate; and
    b.3) first retaining posts arranged circularly and relative to the central axis of rotation $Z_1Z_1'$ of said turntable at the same constant radial distance from said axis $Z_1Z_1'$ greater than that of said first intermediate posts, the various first retaining posts being successively connected to one another at the tops of said first retaining posts by respective circular rails; and
  c) wherein:
    c.1) said first flexible line is wound in a carousel mode which is defined by forming a first layer of stacked turns about said axis $Z_1Z_1'$ against said first winding support along a first axial direction from said turntable towards an intermediate plate or said top plate, or from said top plate towards said turntable or said intermediate plate, followed by at least a second layer of stacked turns about said axis $Z_1Z_1'$ juxtaposed against said first layer of stacked turns along a second axial direction opposite said first axial direction, said first flexible lines extending between said first winding support and said first intermediate posts; and
    c.2) said second flexible line is wound in a rotary basket mode which is defined by forming a first layer of concentric touching turns about said axis $Z_1Z_1'$ in a radial direction from said first intermediate posts towards said first retaining posts, said first layer of concentric touching turns of said second flexible line resting on said turntable and at least a second layer of concentric touching turns about said axis $Z_1Z_1'$ in the radial direction away from said first retaining posts toward said first intermediate posts, said second layer of concentric touching turns of said second flexible line being superposed from said first layer of concentric touching turns of said second flexible line.

2. The ship according to claim 1, further comprising at least:
  second intermediate posts forming third winding supports supporting at least one third flexible line, said second intermediate posts being constituted by said first retaining posts, and
  second retaining posts arranged circularly and relative to the central axis of rotation $Z_1Z_1'$ of said turntable at the same constant radial distance from said axis $Z_1Z_1'$ greater than that of the second intermediate posts, the various second retaining posts being successively connected to one another at the tops of the second retaining posts by respective circular rails;
  said third flexible line being wound in the rotary basket mode which is defined by forming a first layer of concentric touching turns about said axis $Z_1Z_1'$ in a radial direction from said second intermediate posts toward said second retaining posts, said first layer of concentric touching turns of said third flexible line resting on said turntable and at least a second layer of concentric touching turns about said axis $Z_1Z_1'$ in the radial direction away from said second retaining posts toward said second intermediate posts, said second layer of concentric touching turns of said third flexible lines being superposed from said first layer of concentric touching turns of said third flexible line.

3. The ship according to claim 1, further comprising:
  a spooler device comprising at least one support element or supporting at least one flexible line guide and holder device suitable for enabling a first portion of said flexible line that extends between said guide and holder device and the last turn of the last layer of said already-wound or still-wound line to be moved vertically and horizontally in order to spool said flexible line around and against said winding supports, said support element forming a tower or a gantry extending at least in a direction $Z_1Z_1'$ that is perpendicular to and above said deck in the proximity of said turntable;

said flexible line guide and holder device being suitable for enabling said first flexible line to be spooled around and against said central cylinder in said carousel mode comprising:
  i) a first traction device for the line and suitable for tensioning said first portion of the first flexible line, said traction device being a caterpuller; and
  ii) means suitable for moving said first portion of the first flexible line vertically, so that said first portion of the first flexible line can be tensioned substantially horizontally by said first traction device in order to enable the first flexible line to be spooled in the carousel mode with a plurality of coaxial layers of superposed touching turns; and said flexible line guide and holder device also being suitable for enabling at least said second flexible line to be spooled around and against said first intermediate posts respectively in the rotary basket mode, and comprising:
  i) a second fraction device for the line, constituted by a caterpuller, situated at a height higher than said top circular plate and said intermediate posts and retaining posts; and
  ii) means suitable for moving in horizontal translation in a transverse direction YY' perpendicular to said central axis of rotation $Z_1Z_1'$, a first portion of the second flexible line respectively extending in an inclined position between the holder and guide device and the wound second flexible line respectively, so as to enable said second flexible line to be spooled in the rotary basket mode as a plurality of superposed layers of juxtaposed concentric touching turns resting on the same plane.

4. The ship according to claim 3, wherein said first and said second traction devices form a single common line fraction device suitable for being moved vertically or horizontally at constant height to move relative to said support element of said flexible line guide and holder device, said support element comprising a gantry.

5. The ship according to claim 1, wherein at least two flexible lines are wound on said modular storage and handling device, comprising:
  at least one said first flexible line wound on said central cylinder in the carousel mode; and
  at least one second flexible line wound in the rotary basket mode,
    said second flexible line being of larger diameter than said first flexible line.

6. The ship according to claim 1, wherein said turntable is made up of two concentric portions comprising:
  an inner first turntable in the form of a disk suitable for being driven in rotation; and
  an outer second turntable of annular shape that is concentric with said first turntable and arranged around said first turntable, said second turntable being suitable for being held stationary or for being driven in rotation together with said first turntable when said first turntable is driven in rotation.

7. The ship according to claim 1 for laying flexible undersea lines at sea, the ship having a deck including a cavity having arranged therein said circular turntable and a motor-driven support and rotation device for the circular turntable, the top face of said circular turntable not projecting significantly beyond the level of the portion of the deck that is immediately juxtaposed laterally thereto, the periphery of said turntable coming level with said deck, said turntable being supported by and co-operating in rotation with elements of the support and rotation device within said cavity and being fastened to the carrier structure of the hull of the ship, in order to be left there permanently.

8. The ship according to claim 7, wherein said carrier structure of the hull includes additional reinforcing elements in said cavity, and said support and rotation device within said cavity comprises at least:
  a floor fastened to and supported by said additional reinforcing elements of said carrier structure of the hull under said floor;
  rotary guide elements supported by said floor and a rotary shaft supported by additional reinforcing elements of said carrier structure of the hull under said floor; and
  a motor and rotary drive elements for driving the turntable and said rotary shaft in rotation by actuating said motor, the elements being supported by said carrier structure of the hull at the periphery of said cavity.

9. The ship according to claim 7, wherein said attachment elements comprise grooves arranged either radially or circularly, over the surface of said turntable.

10. The ship according to claim 7, wherein the top face of said turntable is a plane and substantially at the same level as a plane of said deck around said turntable.

11. The ship according to claim 7, wherein the deck of the ship comprises two plane portions respectively sloping at an angle ($\beta$) relative to the horizontal to starboard and to port from a central ridge arranged at said middle axial longitudinal direction XX' of the ship,
  and the top face of said turntable is conical in shape, centered on the middle longitudinal axis XX' of the ship, presenting a half-angle at the apex ($\alpha$) greater than 95 grad, a half-angle at the apex ($\alpha$) of value substantially identical to the angle of inclination relative to the vertical of said two plane portions of the deck of the ship.

12. The ship for laying line at sea according to claim 3, further comprising a J-lay tower and at least one said flexible line wound around said storage and handling device including said holder and guide device for holding and guiding a first portion of said flexible line extending between said holder and guide device and the wound flexible line, said flexible line including a curved second portion of said flexible line of catenary shape that is subjected to the tension solely of the own weight of said second portion of said flexible line extending between said holder and guide device and a sheave arranged at a greater height on the tower, and a third portion of said flexible line extending in rectilinear manner within the tower being tensioned with the help of a second traction device secured to said J-lay tower.

13. The ship according to claim 7, wherein said flexible line is an undersea flexible pipe.

14. A method of laying a flexible line at sea from the ship according to claim 12, wherein the following steps are performed:
  1) moving the ship in a manner that is synchronized with the running of the line through said second traction device within the J-lay tower; and 2) unwinding said line by actuating in synchronized manner rotation of said turntable, and moving said first portion of said flexible line that extends between said holder and guide device and the wound line in such a manner as to maintain the curvature of said second portion of said flexible line extending between said holder and guide device and said sheave arranged at a greater height on the tower, with a catenary curve of curvature that is at all points greater than the minimum curvature that is acceptable for the flexible line, and in such a manner that said catenary line portion does not touch the deck of the ship.

15. The method according to claim 14, wherein the following successive steps are performed:
 a) said second flexible line wound in rotary basket is unwound without exerting tension on said sloping first portion of said flexible line extending between said holder and guide device and the wound line, by synchronizing the travel speed of the line with the help of a traction device, with the speed of rotation of said turntable;
 b) when said second flexible line has been unwound and laid at sea, removing said retaining posts and said intermediate posts; and
 c) unwinding and laying at sea said first line wound in the carousel mode by exerting substantially constant tension on a first horizontal portion of said flexible line extending in a position that is maintained substantially horizontal between the said holder and guide device and said flexible line wound on said central cylinder.

16. The ship according to claim 1, wherein said flexible lines comprise only said first flexible line and said second flexible line, said first retaining posts being peripheral retaining posts.

17. The ship according to claim 2, wherein said flexible lines comprise only said first flexible line, said second flexible line and said third flexible line, said second retaining posts being peripheral retaining posts.

18. The ship for laying line at sea according to claim 7, further comprising a J-lay tower and at least one said flexible line wound around said storage and handling device including said holder and guide device for holding and guiding a first portion of said flexible line extending between said holder and guide device and the wound flexible line, said flexible line including a curved second portion of said flexible line of catenary shape that is subjected to the tension solely of the own weight of said second portion of said flexible line extending between said holder and guide device and a sheave arranged at a greater height on the tower, and a third portion of said flexible line extending in rectilinear manner within the tower being tensioned with the help of a second traction device secured to said J-lay tower.

19. The ship according to claim 1, wherein said second flexible lines have diameters greater than diameters of said first flexible lines.

* * * * *